(12) United States Patent  
Akiyama

(10) Patent No.: US 7,404,643 B2  
(45) Date of Patent: Jul. 29, 2008

(54) PROJECTOR HAVING POLARIZATION CONVERSION ELEMENT

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 281 days.

(21) Appl. No.: 11/177,420

(22) Filed: Jul. 11, 2005

(65) Prior Publication Data

US 2006/0007398 A1 Jan. 12, 2006

(30) Foreign Application Priority Data

Jul. 12, 2004 (JP) ............................. 2004-204575  
Apr. 14, 2005 (JP) ............................. 2005-116564

(51) Int. Cl.  
*G03B 21/14* (2006.01)  
*H04N 9/14* (2006.01)

(52) U.S. Cl. ............................. 353/20; 353/32; 353/81; 348/742; 348/752

(58) Field of Classification Search .................. 353/20, 353/31–34, 37, 98, 84, 97, 102, 81; 348/742–749, 348/752; 349/5–9  
See application file for complete search history.

(56) References Cited

U.S. PATENT DOCUMENTS

| | | | |
|---|---|---|---|
| 6,000,802 A * | 12/1999 | Hashizume et al. ........... 353/38 |
| 6,147,802 A | 11/2000 | Itoh et al. |
| 6,246,450 B1 * | 6/2001 | Inbar ............................. 349/5 |
| 6,310,723 B1 | 10/2001 | Itoh et al. |
| 6,344,927 B1 | 2/2002 | Itoh et al. |
| 6,411,438 B1 | 6/2002 | Itoh et al. |
| 6,445,500 B1 | 9/2002 | Itoh |
| 6,497,488 B1 * | 12/2002 | Yamauchi et al. ............. 353/38 |
| 6,667,834 B2 | 12/2003 | Itoh |
| 6,834,962 B2 * | 12/2004 | Seo ............................. 353/20 |

(Continued)

FOREIGN PATENT DOCUMENTS

JP 09-120067 A 5/1997

(Continued)

OTHER PUBLICATIONS

Taiichiro Kurita, NHK Science and Technical Research Laboratories, "Picture Quality of Hold Type Display for Moving Images", Technical Report of the Institute of Electronics, Information and Communications Engineers, EID99-10, pp. 55-60 w/English translation.

*Primary Examiner*—Andrew T Sever  
(74) *Attorney, Agent, or Firm*—Oliff & Berridge, PLC

(57) ABSTRACT

A projector has an illumination system, an electro-optical modulator, a projection optical system, and a scanning system. The illumination system has a light source, a first lens array, a second lens array, a polarization conversion element and a superposing lens. The polarization conversion element includes a polarized light separating element and a phase plate. The polarized light separating element includes a plurality of polarized light separating prisms each of which has a polarized light separating surface and a reflection surface. The plurality of polarized light separating prisms are arranged along the one direction, and polarized light separating surfaces in the polarized light separating prisms at both ends of the polarized light separating element in one direction are constituted so as to reflect the luminous flux involving the second polarized light component in a direction approaching the illumination optical axis.

14 Claims, 13 Drawing Sheets

U.S. PATENT DOCUMENTS

| | | | |
|---|---|---|---|
| 6,896,371 B2* | 5/2005 | Shimizu et al. | 353/31 |
| 7,052,141 B2* | 5/2006 | Akiyama | 353/38 |
| 7,104,652 B2 | 9/2006 | Kojima | |
| 7,119,957 B2 | 10/2006 | Itoh et al. | |
| 7,213,927 B2* | 5/2007 | Akiyama | 353/97 |
| 2002/0093737 A1 | 7/2002 | Itoh et al. | |
| 2002/0191154 A1* | 12/2002 | Shahzad et al. | 353/20 |
| 2003/0164901 A1* | 9/2003 | Ouchi et al. | 348/744 |
| 2005/0036075 A1* | 2/2005 | Taoka et al. | 348/761 |
| 2005/0168699 A1* | 8/2005 | Suzuki et al. | 353/31 |
| 2005/0185144 A1* | 8/2005 | Imahase et al. | 353/31 |
| 2006/0007521 A1* | 1/2006 | Akiyama | 359/290 |
| 2006/0061894 A1* | 3/2006 | Li | 359/858 |
| 2006/0092390 A1* | 5/2006 | Akiyama | 353/102 |
| 2006/0164601 A1* | 7/2006 | Akiyama | 353/33 |
| 2006/0187417 A1* | 8/2006 | Akiyama et al. | 353/33 |
| 2006/0187418 A1* | 8/2006 | Akiyama | 353/33 |
| 2006/0192922 A1* | 8/2006 | Akiyama | 353/33 |
| 2006/0203202 A1* | 9/2006 | Uchiyama et al. | 353/31 |
| 2006/0256288 A1* | 11/2006 | De Vaan | 353/20 |
| 2007/0024974 A1 | 2/2007 | Itoh et al. | |
| 2007/0035704 A1* | 2/2007 | Akiyama | 353/102 |

FOREIGN PATENT DOCUMENTS

| | | |
|---|---|---|
| JP | 2002-148712 A | 5/2002 |
| JP | A-2002-287096 | 10/2002 |
| JP | A-2004-139020 | 5/2004 |

* cited by examiner

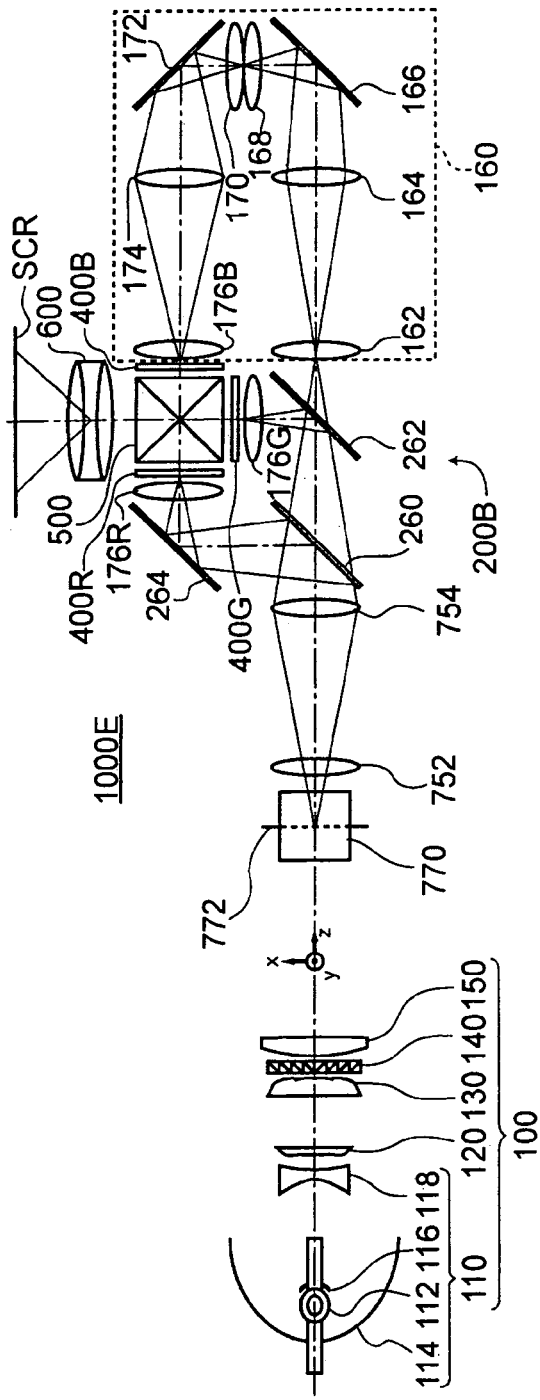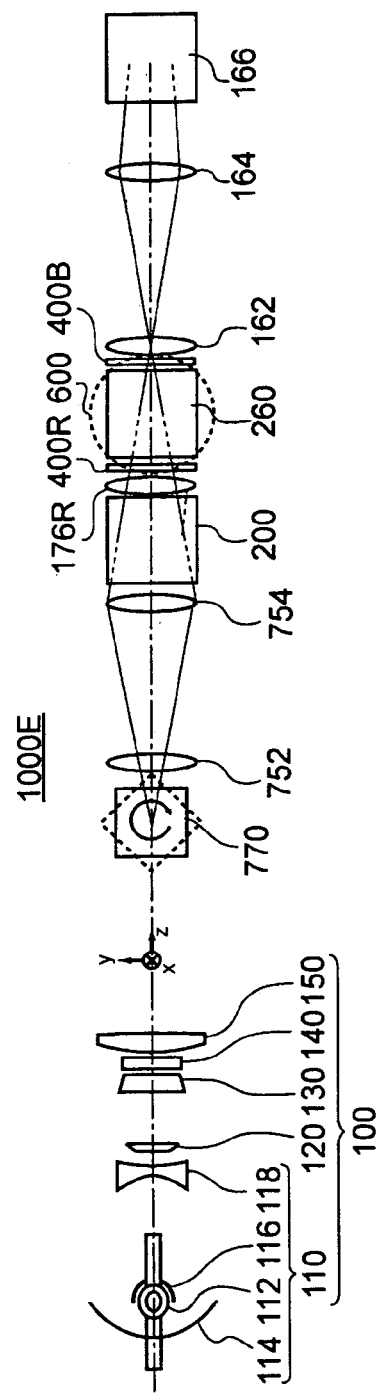
Fig. 12A
Fig. 12B

PROJECTOR HAVING POLARIZATION CONVERSION ELEMENT

BACKGROUND

Aspects of the invention can relate to a projector. FIGS. 13(a) through 13(c) are diagrams showing a related art projector. FIG. 13(a) is a diagram showing an optical system of the related art projector, and FIGS. 13(b) and 13(c) are diagrams for explaining problems caused by such a related art projector.

In such a projector 900A, liquid crystal devices 400R, 400G and 400B that are used as an electro-optical modulator can be a hold-type display device that has the brightness characteristics, such as shown in FIG. 13(b). Accordingly, different from a case of a CRT that is an impulse type display device having the brightness characteristics such as shown in FIG. 13(c), there is a problem in that because of a so-called persistence of vision a moving picture cannot be smoothly displayed. The persistence of vision, for example, is described in "Image Quality of Moving Picture Display in Hold Type Display", Technical Report of the Institute of Electronics, Information and Communication Engineers, EID99-10, pp.55 to 60 (June, 1999).

FIGS. 14(a) through 14(c) are diagrams that explain another related art projector. FIG. 14(a) is a diagram showing an optical system of such another related art projector, and FIGS. 14(b) and 14(c) are diagrams for showing light shutters that are used in such another related art projector.

In a projector 900B, as shown in FIG. 14(a), light shutters 420R, 420G and 420B are disposed toward a light incident side of liquid crystal devices 400R, 400G and 400B to intermittently shut light by use of the light shutters, and thereby the foregoing problem is overcome. That is, the so-called persistence of vision is alleviated, and thereby a smooth and excellent moving picture display is realized. See, for example, patent literature 1: JP-A No. 2002-148712 (FIGS. 1 through 7).

However, in such other related projectors, light is intermittently intermitted by the light shutters. Accordingly, there is a problem in that the light availability can be largely deteriorated.

SUMMARY

Aspects of the invention can overcome such problems and provide a projector in which, even when a smooth and excellent quality moving picture display is enabled to obtain, the light availability is not largely deteriorated.

An exemplary projector according to an aspect of the invention can include an illumination system that includes a light source device emitting a luminous flux toward a region to be illuminated, a first lens array having a plurality of small lenses for separating the luminous flux emitted from the light source device into a plurality of partial light fluxes, a second lens array having a plurality of small lenses corresponding to the plurality of small lenses of the first lens array, a polarization conversion element that converts non-polarized light contained in the luminous flux emitted from the second lens array into polarized light, and a superposing lens for superposing individual partial light fluxes emitted from the polarization conversion element in a region to be illuminated, an electro-optical modulator that modulates a luminous flux emitted from the illumination system in accordance with image information; a projection optical system that projects the luminous flux modulated by the electro-optical modulator; and a scanning system.

In the exemplary projector, the small lenses each in the first lens array have, so as to make the luminous flux emitted from the illumination system a luminous flux having a sectional shape that illuminates an entirety of an image formation region in one direction of vertical and horizontal directions in the image formation region of the electro-optical modulator and partially illuminates the image formation region thereof in the other direction, a planar shape compressed in the other direction; the scanning system is disposed between the illumination device and the electro-optical modulator so as to scan the luminous flux along the other direction on the image formation region in synchronization with a frame rate of the electro-optical modulator. The light source device can emit a luminous flux diverging with the travel toward a region to be illuminated. The plurality of small lenses in the first lens array can be arranged along the one direction and the other direction. The polarization conversion element includes a polarized light separating element that splits the luminous flux into a luminous flux involving a first polarized light component and a luminous flux involving a second polarized light component; and a phase plate that converts one of the luminous flux involving a first polarized light component and the luminous flux involving a second polarized light component into the other.

The polarized light separating element can include a plurality of polarized light separating prisms each of which has a polarized light separating surface that allows the luminous flux involving the first polarized light component to go through as it is and reflects the luminous flux involving the second polarized light component in a direction perpendicular to an illumination optical axis; and a reflection surface that reflects the second polarized light component in a direction in parallel with the illumination optical axis. The plurality of polarized light separating prisms can be arranged along the one direction, and the polarized light separating surfaces in the polarized light separating prisms at both ends of the plurality of polarized light separating prisms in one direction of the polarized light separating elements are constituted so as to reflect the luminous flux involving the second polarized light component in a direction approaching the illumination optical axis.

As a result, according to the exemplary projector, a luminous flux has such a sectional shape that in any one of vertical and horizontal directions in an image formation region of an electro-optical modulator an entirety of the image formation region is illuminated, and in the other direction the image formation region is partially illuminated(that is, a sectional shape compressed in the other direction). Such luminous flux can be scanned along the other direction on the image formation region in synchronization with a frame rate of the electro-optical modulator. Accordingly, in the image formation region of the electro-optical modulator, a light illuminated region and a light non-illuminated region can be sequentially and alternately scrolled. As a result, since the persistence of vision can be alleviated, a projector where a smooth and excellent moving picture can be displayed can be realized.

Furthermore, according to the exemplary projector, the luminous flux having a cross sectional shape compressed in the other direction as mentioned above is realized by use of, as a first lens array, a lens array in which a planar shape of individual small lenses is compressed in the other direction. Accordingly, different from a case where a light shutter is used, since the luminous flux emitted from a light source device can be efficiently introduced to an image formation region of the electro-optical modulator, the light availability is not largely deteriorated.

Accordingly, in the invention, even when a smooth and excellent quality moving picture is enabled to realize, a projector in which the light availability is not largely deteriorated can be realized, and thereby an object of the invention can be achieved.

Furthermore, according to the exemplary projector, the small lenses in the first lens array are arranged along one direction and the other direction; accordingly, the light intensity distribution in the region to be illuminated of the electro-optical modulator can be to a certain extent homogenized.

Still furthermore, according to an aspect of the projector, the polarized light separating surfaces in the polarized light separating prisms at both ends in one direction of the polarized light separating element are constituted so as to reflect the luminous flux involving the second polarized light component in a direction approaching the illumination optical axis. In other words, in comparison with a case where the polarized light separating surfaces of the polarized light separating prisms at both ends in one direction of the polarized light separating element reflect the luminous flux involving the second polarized light component in a direction receding from the illumination optical axis, partial light fluxes incident on the polarized light separating prisms at both ends in one direction of the polarized light separating element take positions distant from the illumination optical axis. Accordingly, the first lens array that splits the luminous flux emitted from the light source device and diverging with the travel toward a region to be illuminated into a plurality of partial light fluxes and inputs the partial light fluxes on the polarized light separating surfaces located more distant from the illumination optical axis are not necessary to impart the partial light flux the refractive force toward the optical axis. Accordingly, there is no need of largely decentering the small lenses of the first lens array that emits the partial light fluxes that enter on the polarized light separating prisms on both ends in one direction of the polarized light separating element.

As a result, since a lens thickness of the first lens array can be made thinner, the first lens array, and resultantly, a projector, can be made lighter in weight. Furthermore, since the lens thickness of the first lens array can be made thinner, a cooling time period when the first lens array is manufactured by use of press working can be shortened. Accordingly, the manufacturing time period can be shortened and the manufacturing cost can be reduced.

According to the projector, owing to an action of the polarization conversion element, the luminous flux can be converted into polarized light having one polarization axis. Accordingly, the projector becomes one that can be suitably applied to a case where as the electro-optical modulator, like a liquid crystal device, an electro-optical modulator that uses polarized light is used.

As the electro-optical modulator, ones in which a planar shape of an image formation region is formed into a rectangular one having a ratio of vertical dimension: horizontal dimension=3:4 and a rectangular one having a ratio of vertical dimension: horizontal dimension=9:16 are in wide use. Accordingly, as a planar shape of the individual small lenses of the first lens array in the projector according to an aspect of the invention, for instance, a rectangular one having a ratio of vertical dimension: horizontal dimension=3:8, a rectangular one having a ratio of vertical dimension: horizontal dimension=9:32 and a rectangular one having a ratio of vertical dimension: horizontal dimension=1:4 can be preferably used.

Furthermore, in the exemplary projector according to an aspect of the invention, it is preferable that in the plurality of small lenses of the first lens array a column along the one direction is arranged in four columns along the other direction, in the plurality of small lenses of the second lens array a column along the one direction is arranged in four columns along the other direction, the plurality of polarized light separating prisms can be arranged in four columns corresponding to columns of the plurality of small lenses in the first lens array, among the plurality of polarized light separating prisms the polarized light separating surfaces in the polarized light separating prisms in the first and fourth columns are constituted so as to reflect the luminous flux involving the second polarized light component in a direction approaching the illumination optical axis, and the polarized light separating surfaces in the polarized light separating prisms in the second and third columns are constituted so as to reflect the luminous flux involving the second polarized light component in a direction receding from the illumination optical axis.

By configuring thus, since a partial light flux that goes past the small lenses in the first and fourth columns in the second lens array and a partial light flux that goes past the small lenses in the second and third columns in the second lens array are largely distanced, in the second lens array a distance between the small lenses in the first and second columns and a distance between the small lenses in the third and fourth columns can be made larger. Accordingly, in a portion between these, the lens function can be made unnecessary. Furthermore, since the small lenses in the first lens array are arranged in four columns along the one direction, a dimension of the small lens can be made a dimension larger than a certain extent. Accordingly, a length of a side along the other direction of the small lens in the first lens array does not become extremely short. As a result, the partial light fluxes emitted from the individual small lenses of the first lens array can be excellently taken in by the corresponding second lens array, and thereby excellent light availability can be obtained.

Furthermore, in the projector according to an aspect of the invention, it is preferable that in the plurality of small lenses of the first lens array a column along the one direction is arranged in four columns along the other direction, in the plurality of small lenses of the second lens array a column along the one direction is arranged in four columns along the other direction, the plurality of polarized light separating prisms is arranged in four columns corresponding to columns of the plurality of small lenses in the first lens array, and among the small lenses in the second lens array between the small lenses in the first and second columns and between the small lenses in the third and fourth columns, a concave surface portion is disposed.

In the exemplary projector as described above, in the second lens array, a distance between the small lenses in the first and second columns and a distance between the small lenses in the third and fourth columns can be largely separated. Accordingly, when a concave surface portion is disposed in such largely distanced portion, the second lens array, resultantly a projector can be made lighter in weight. Furthermore, when a concave surface portion is disposed in the largely distanced portion, a cooling time period can be shortened when the second lens array is formed, resulting in shortening a manufacturing time and reducing the manufacturing cost.

Furthermore, in the exemplary projector, it is preferable that in the plurality of small lenses of the first lens array a column along the one direction is arranged in four columns along the other direction, in the plurality of small lenses of the second lens array a column along the one direction is arranged in four columns along the other direction, the plurality of polarized light separating prisms is arranged in four columns corresponding to columns of the plurality of small lenses in the first lens array, and among the small lenses of the second lens array between the small lenses in the first and second columns and between the small lenses in the third and fourth columns, a smooth connection is formed.

In the exemplary projector, as described above, in the second lens array, a distance between the small lenses in the first and second columns and a distance between the small lenses in the third and fourth columns can be largely separated. Accordingly, there is no need of forming this portion in a precise lens. As a result, by smoothly connecting this portion, a manufacturing cost of a mold when the second lens array is manufactured according to the press working can be reduced.

Furthermore, in the exemplary projector, it is preferable that in the plurality of small lenses of the first lens array a column along the one direction is arranged in four columns along the other direction, in the plurality of small lenses of the second lens array a column along the one direction is arranged in four columns along the other direction, the plurality of polarized light separating prisms is arranged in four columns corresponding to columns of the plurality of small lenses in the first lens array, among the plurality of polarized light separating prisms the polarized light separating surfaces in the polarized light separating prisms in the first and fourth columns are constituted so as to reflect the luminous flux involving the second polarized light component in a direction approaching the illumination optical axis, and the polarized light separating surfaces in the polarized light separating prisms in the second and third columns are constituted so as to reflect the luminous flux involving the second polarized light component in a direction approaching the illumination optical axis.

By constituting thus as well, as described above, there is no need of the first lens array corresponding to the partial light fluxes going past the small lenses in the first and fourth columns in the second lens array imparting as ever the partial light fluxes the refractive force directing to the illumination optical axis, and furthermore there is no need of the first lens array corresponding to the partial light fluxes going past the small lenses in the second and third columns in the second lens array as well imparting as ever the partial light fluxes the refractive force directing to the illumination optical axis. Accordingly, there is no need of largely decentering the small lenses in the first through fourth columns in the first lens array that splits the luminous flux emitted from the light source device and diverging with travel toward a region to be illuminated. As a result, since a lens thickness of the first lens array can be made thinner, the first lens, resultantly a projector can be made lighter in weight. Furthermore, when the lens thickness of the first lens array can be made thinner, a cooling time period can be shortened when the first lens array is manufactured by use of the press working, resulting in shortening a manufacturing time period and reducing the manufacturing cost.

In the exemplary projector, an optical axis of each of the small lenses in the first lens array is preferably within a width of each of the small lenses in the one direction. When configured thus, since an amount of eccentricity in each of the small lens in the first lens array is small, a lens thickness of the first lens array can be made thinner. Furthermore, partial light fluxes going past the small lenses in the first and fourth columns in the second lens array become distanced more than ever from the illumination optical axis and can be excellently introduced on the polarized light separating surfaces in the polarized light separating prisms in the first and fourth columns.

In the projector according to an aspect of the invention, the individual small lenses in the first lens array are preferable for the small lenses more distanced from the illumination optical axis in the column along the other direction to be larger in the amount of eccentricity in the other direction. When configured thus, arc images can be excellently separated in the direction along the other direction in the second lens array and the light availability can be improved.

In the exemplary projector according to an aspect of the invention, it is preferable that in the first lens array the plurality of small lenses is arranged so that a column along the one direction is arranged in four columns along the other direction, the plurality of polarized light separating prisms is arranged in four columns corresponding to columns of the plurality of small lenses in the first lens array, and in the individual small lenses in the first lens array, in comparison with the amount of eccentricity in the other direction of the small lenses in the first and fourth columns, the amount of eccentricity of the small lenses in the other direction of the second and third columns are larger.

It is conventionally not so good in the separation of the arc images in the vicinity of the second lens array, hence it is not easy to improve the light availability of the partial light fluxes from the second and third columns of the first lens array. Accordingly, when, as mentioned above, the amounts of eccentricity of the small lenses of the first lens array in the other direction in the second and third columns are made larger than that of small lenses in the other direction of the first and fourth columns, the arc images can be excellently separated and the light availability can be easily improved.

In the projector according to an aspect of the invention, the plurality of small lenses in the first lens array is preferably arranged in 8 to 10 columns along the other direction. When configured thus, a length of a side along the other direction of the small lenses each in the first lens array does not become extremely short; accordingly, the partial light fluxes emitted from the individual small lenses of the first lens array are excellently taken in the corresponding second lens array and thereby excellent light availability can be obtained.

In the exemplary projector, the light source device can include an arc tube having a light emission portion, an ellipsoidal reflector reflecting light emitted from the light emission portion, a concave lens converting light reflected from the ellipsoidal reflector into a luminous flux diverging with the travel toward a region to be illuminated, and an auxiliary mirror reflecting light emitted from the light emission portion toward the region to be illuminated to the light emission portion. In the above, the auxiliary mirror preferably has a shape partially removed in a reflection concave surface so that a length along the other direction in a section of the luminous flux on a light incident surface of the first lens array may be shorter than that along the one direction.

When configured thus, a sectional shape of the luminous flux reflected by the ellipsoidal reflector becomes a shape in which the other direction is smaller than the one direction. Accordingly, since dimensions along the other direction in the individual optical elements in later stages including a concave lens, a first lens array, a second lens array, a polarization conversion element and a superposing lens can be made shorter, an entirety of the apparatus can be made smaller. Furthermore, a sectional shape of the luminous flux reflected by the ellipsoidal reflector becomes one excellent in the compatibility with a sectional shape of the individual small lenses in the first lens array having a shape compressed in the other direction.

In the projector according to an aspect of the invention, the ellipsoidal reflector, when light emitted from the light emission portion is assumed to go past without being reflected by the auxiliary mirror, preferably has a shape in which a portion of the reflection concave surface necessary for reflecting the passing light is eliminated.

When configured thus, since a dimension along the other direction of the ellipsoidal reflector can be made shorter, the apparatus as a whole can be made smaller.

In the projector according to an aspect of the invention, in a cross section of the luminous flux on a light incident surface of the first lens array, a ratio of a length along the other direction to a length along the one direction is preferably in the range of 30 to 80%.

When the ratio is less than 30%, the light availability of the luminous flux reflected by the ellipsoidal reflector becomes difficult to maintain and the number of rows of the small lenses in the first array becomes impossible to secure; accordingly, a light intensity distribution on the electro-optical modulator can be made uniform with difficulty. On the other hand, when the ratio exceeds 80%, an effect of enabling to make the apparatus smaller becomes smaller. From the viewpoints, the ratio is more preferably in the range of 40 to 70%.

In the projector according to an aspect of the invention, the first lens array preferably has a light incident surface toward the ellipsoidal reflector than a second point of focus of the ellipsoidal reflector and is disposed at such a position that on the light incident surface an amount of light of the luminous flux emitted from the light source device may distribute over an entirety. When configured thus, the amount of light of the luminous flux emitted from the light source device on the light incident surface of the first lens array distribute over an entirety. Accordingly, even when the first lens array is made lower in the density of lenses by arranging the small lenses in four columns, without lowering the in-plane light intensity distribution characteristics on a region to be illuminated of the electro-optical modulator, the first lens array can be simplified in the manufacturing process and rendered lower in the manufacturing cost.

In this case, the first lens array is preferably disposed at a position where a region extremely small in the incident light intensity (a shadow region of an arc tube) may not exist in a center portion of the light incident surface of the first lens array. When configured thus, on the light incident region of the first lens array, an amount of light of the luminous flux emitted from the light source device becomes distributed over an entirety.

In the projector according to an aspect of the invention, it is preferable that between the illumination device and the electro-optical modulator a color separating optical system for separating the luminous flux emitted from the illumination device into a plurality of color lights is further disposed, and as the electro-optical modulator a plurality of electro-optical modulators that modulates the plurality of color lights emitted from the color separating optical system in accordance with image information corresponding to the respective color lights and a dichroic prism that synthesizes the color lights modulated by the plurality of electro-optical modulators are disposed. When configured thus, even when a smooth and excellent moving image display is enabled to obtain, a projector where the light availability is not largely deteriorated can be made a (for instance, three-panels type) full-color projector excellent in the image quality.

The exemplary projector is preferably configured so that the scanning system is disposed between the illumination device and the color separating optical system at a position substantially conjugated with the electro-optical modulator and includes a rotating prism having a rotary axis perpendicular to the illumination optical axis, and the rotating prism rotates and thereby on the electro-optical modulator a light illuminated region and a light non-illuminated region are sequentially scrolled in synchronization with a frame rate of the electro-optical modulator. When configured thus, in an image formation region of the individual electro-optical modulators in a full-color projector, a smooth scroll operation of a light illuminated region and a light non-illuminated region can be realized.

BRIEF DESCRIPTION OF THE DRAWINGS

The invention will be described with reference to the accompanying drawings, wherein like numbers reference like elements, wherein:

FIGS. 12(a) and 12(b) are diagrams showing an optical system of a projector according to an exemplary embodiment;

DETAILED DESCRIPTION OF EMBODIMENTS

Figure 1A:
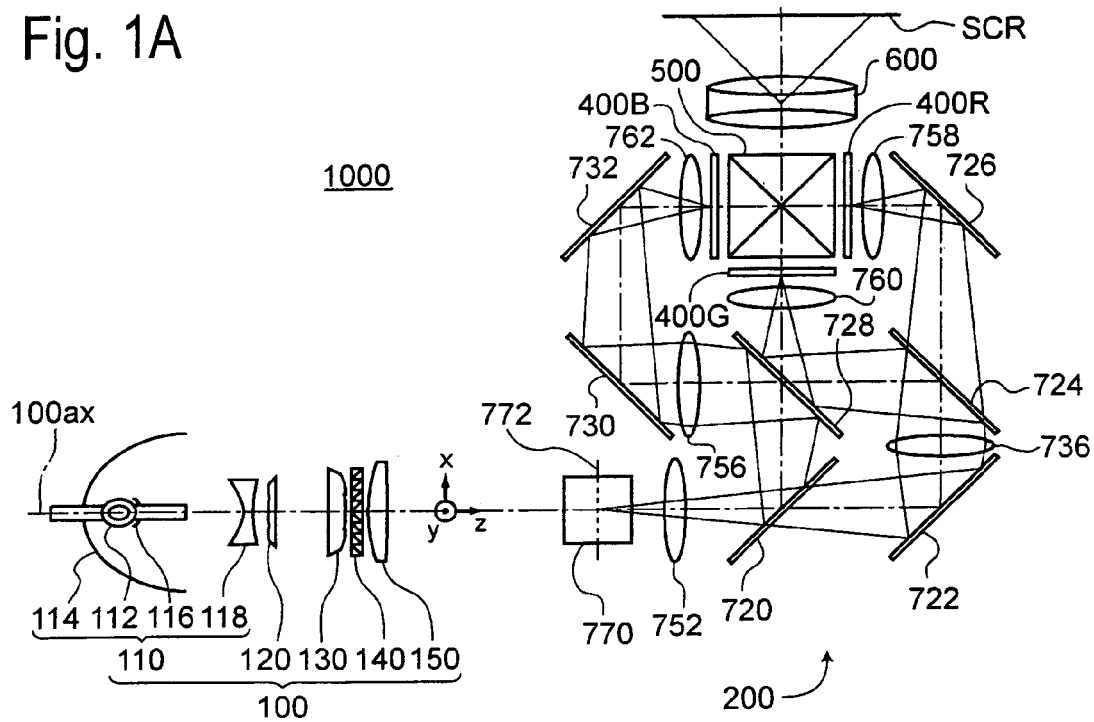
FIGS. 1(a) through 1(c) are diagrams for explaining a projector according to an exemplary embodiment.

In what follows, an exemplary projector according to aspects of the invention will be described based on embodiments shown in the drawings.

Figure 1B:
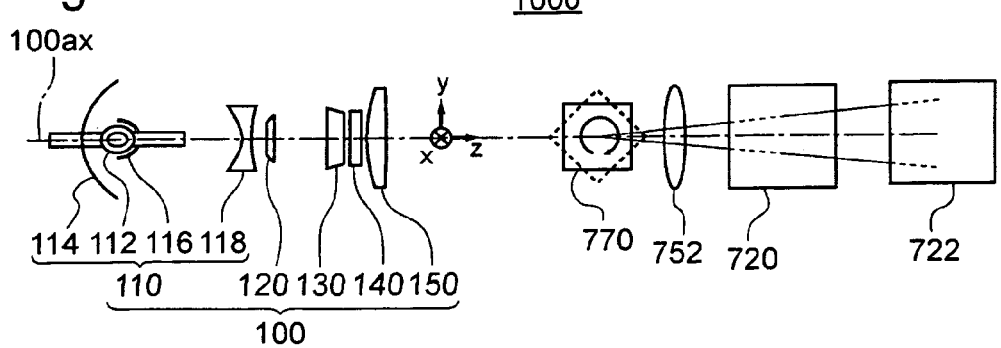
Figure 1C:
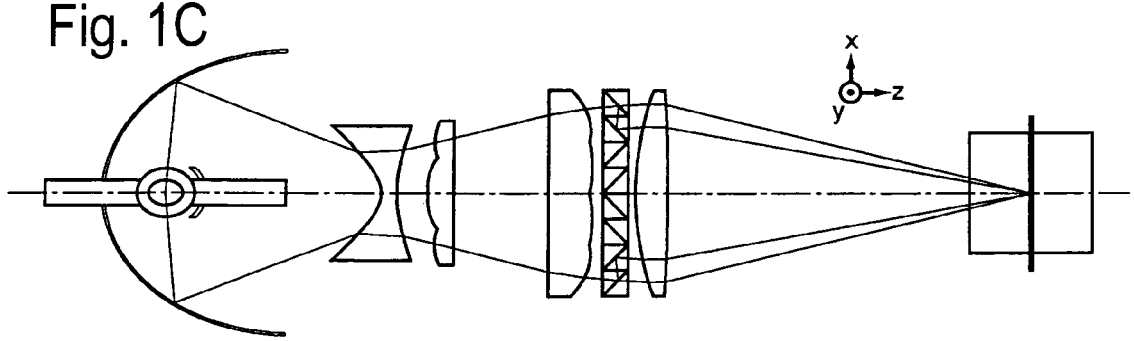

FIGS. 1(a) through 1(c) are diagrams showing for explaining a projector according to an exemplary embodiment. FIG. 1(a) is a diagram that sees an optical system of a projector according to the exemplary embodiment from a top surface, FIG. 1(b) is a diagram that sees the optical system from a side surface, and FIG. 1(c) is a diagram schematically showing a trajectory of a light ray in an illumination device.

In the following explanations, three directions orthogonal to each other, respectively, are called as a z-axis direction (an illumination optical axis 100ax direction in FIG. 1(a)), an x-axis direction (a direction in parallel with a page space and orthogonal to the z-axis in FIG. 1(a) and a y-axis direction (a direction perpendicular to a page space and orthogonal to the z-axis in FIG. 1(a)).

A projector 1000 according to an exemplary embodiment, as shown in FIGS. 1(a) and 1(b), is a projector including an illumination device 100, a color separating optical system 200 that separates a luminous flux from the illumination device 100 into three color lights of red, green and blue, three liquid crystal devices 400R, 400G and 400B as an electro-optical modulator that modulates each of three color lights separated by the color separating optical system 200 in accordance with image information, a cross dichroic prism 500 that synthesizes color lights modulated by the three liquid crystal devices 400R, 400G and 400B, and a projection optical system 600 that projects light synthesized by the cross dichroic prism 500 on a projection surface such as a screen SCR.

The illumination device 100, as shown in FIGS. 1(a) and 1(b) can include a light source device 110 emitting a luminous flux diverging with travel toward a region to be illuminated; a first lens array 120 having a plurality of small lenses 122 (FIG. 3) for separating the luminous flux emitted from the light source device 110 into a plurality of partial light fluxes, a second lens array 130 having a plurality of small lenses (not shown in the drawing) corresponding to the plurality of small lenses 122 of the first lens array 120, a polarization conversion element 140 for converting the luminous fluxes into a substantially one kind of linearly-polarized light; and a superposing lens 150 for superposing individual partial light fluxes from the polarization conversion element 140 on the region to be illuminated.

The light source device 110, as shown in FIGS. 1(a) and 1(b) can include an ellipsoidal reflector 114, an arc tube 112 having a light emission center in the proximity of a first point of focus of the ellipsoidal reflector 114, and a concave lens 118 converting converged light reflected from the ellipsoidal reflector 114 into diverging light. The arc tube 112 is provided with an auxiliary mirror 116 as a reflecting device that reflects light emitted from the arc tube 112 toward the region to be illuminated toward the ellipsoidal reflector 114.

The light source device 110 emits a luminous flux with an illumination optical axis 100ax as a center axis.

The first lens array 120 can be provided with a plurality of small lenses 122 arranged in a plane perpendicular to the illumination optical axis 100ax and splits the luminous flux emitted from the light source device 110 into a plurality of partial light fluxes in accordance with the plurality of small lenses 122.

The second lens array 130 is provided with a plurality of small lenses arranged in a plane perpendicular to the illumination optical axis 100ax. The small lenses respectively, correspond to the partial light fluxes that are split by the first lens array 120 and condense the individual partial light fluxes so as to enter on a polarized light separating surface of the polarization conversion element 140.

The polarization conversion element 140 can convert the partial light fluxes emitted from the second lens array 130 into substantially one kind of linearly polarized light and emits. Accordingly, owing to an action of the polarization conversion element 140, the luminous flux can be converted into polarized light having one polarization axis. As a result, a luminous flux suitable for a case where, like liquid crystal devices 400R, 400G and 400B of a projector 1000 according to exemplary embodiment, an electro-optical modulator that utilizes polarized light like a liquid crystal device is used as an electro-optical modulator can be obtained.

The superposing lens 150 is an optical element that superposes a plurality of partial light fluxes emitted from the polarization conversion element 140 in the vicinity of a plane that is perpendicular to the illumination optical axis 100ax and includes a rotation axis 772 of a rotating prism 770.

The rotating prism 770 is rotated with a rotation axis 772 as an axis, moves a transit position of an incident luminous flux in a plane perpendicular to the illumination optical axis 100ax in the vicinity of the rotation axis 772, and thereby on image formation regions of the liquid crystal devices 400R, 400G and 400B an illuminated region and a non-illuminated region are scrolled.

The ellipsoidal reflector 114 and the auxiliary mirror 116 of the light source device 110, the first lens array 120 and the polarization conversion element 140, and the rotating prism 770 will be detailed below.

A luminous flux exited from the rotating prism 770 enters a color separating optical system 200.

As the color separating optical system 200, as shown in FIG. 1(a), an equal length of optical path optical system in which lengths of optical path from the illumination device 100 to the liquid crystal devices 400R, 400G and 400B are equal is used.

The color separating optical system 200, as shown in FIG. 1(a) can include dichroic mirrors 720 and 724, reflection mirrors 722, 726, 728, 730 and 732, relay lenses 752, 736 and 756, and field lenses 758, 760 and 762.

The relay lenses 752, 736 and 756 are optical elements that focus a luminous flux exited from the rotating prism 770 on image formation regions of the liquid crystal devices 400R, 400G and 400B.

The field lenses 758, 760 and 762 are disposed to convert individual partial light fluxes into light fluxes in substantially parallel with the respective principal rays.

The dichroic mirror 720 allows, of light exited from the rotating prism 770, a red component and a green component to transmit and reflects a blue component. The blue component reflected by the dichroic mirror 720 is reflected by the reflection mirrors 728, 730 and 732 and reaches a blue liquid crystal device 400B. On the other hand, the red and green components past through the dichroic mirror 720 are reflected by the reflection mirror 722 and enter the dichroic mirror 724. In the dichroic mirror 724, the red component is allowed to go through and the green component is reflected. The red component past through the dichroic mirror 724 is reflected by the reflection mirror 726 and reaches a red liquid crystal device 400R. Furthermore, the green component reflected by the dichroic mirror 724 is further reflected by the reflection mirror 728 and reaches a green liquid crystal device 400G The liquid crystal devices 400R, 400G and 400B modulate the luminous flux in accordance with image information to form an image for each of the individual colors and become illumination targets of the illumination device 100. Though omitted from showing in the drawing, between the field lenses 758, 760 and 762 and the individual liquid crystal devices 400R, 400G and 400B1 incidence side polarizing plates are interposed, respectively, and between the individual liquid crystal devices 400R, 400G and 400B and the dichroic prism 500, exit side polarizing plates are interposed, respectively. With the incidence side polarizing plates, the liquid crystal devices 400R, 400G and 400B and the exit side polarizing plates, individual incident color lights are optically modulated.

The liquid crystal devices 400R, 400G and 400B each are one formed by closely sealing a liquid crystal that is an electro-optical material between a pair of transmissive glass substrates and, with, for instance, a poly-silicon TFT as a switching element, in accordance with a given image signal, modulate a direction of polarization of one kind of linearly polarized light emitted from the incidence side polarizing plate.

As the liquid crystal devices 400R, 400G and 400B, a liquid crystal device for use in wide vision, which has a planar shape of a rectangle having a ratio of a vertical dimension along a y-axis direction to a horizontal dimension along an X-axis direction of 9:16, is used.

The cross dichroic prism 500 is an optical element that synthesizes optical images modulated for the individual color lights exited from the exit side polarizing plates and forms a color image. The cross dichroic prism 500 is formed by adhering 4 right-angle prisms to form a substantial cubic shape in a plan view, and, on a substantial X-shaped interface formed between adhered right-angle prisms, a dielectric multi-layered film is formed. A dielectric multi-layered film formed on one interface of the substantial X-shape reflects red color and a dielectric multi-layered film formed on the other interface reflects blue color. The dielectric multi-layered films refract the red and blue lights and thereby align these with a travel direction of the green light, and thereby three color lights are synthesized.

A color image exited from the cross dichroic prism 500 is enlarged and projected with a projection optical system 600, and thereby a large screen image is formed on a screen SCR.

In what follows, an ellipsoidal reflector 114, an auxiliary mirror 116, a first lens array 120, a polarization conversion element 140 and a rotating prism 770 in a projector 1000 according to the exemplary embodiment will be detailed.

1. Ellipsoidal Reflector and Auxiliary Mirror

Figure 2A:
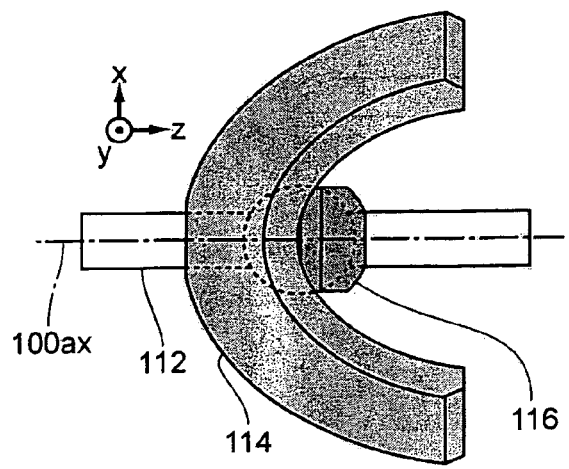
FIGS. 2(a) through 2(d) are diagrams showing for explaining shapes of an ellipsoidal reflector and an auxiliary mirror in the exemplary embodiment.
Figure 2B:
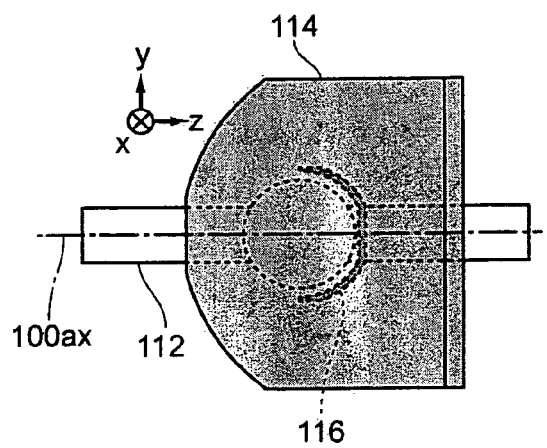
Figure 2C:
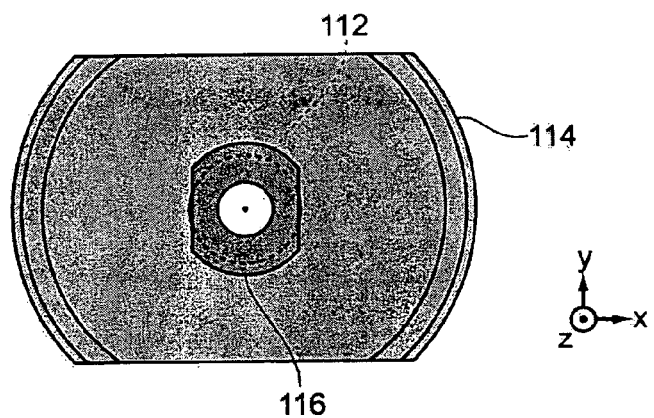
Figure 2D:
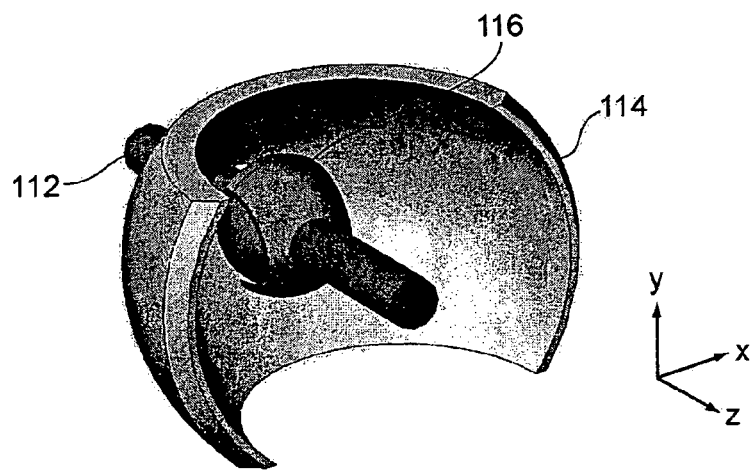

FIGS. 2(a) through 2(d) are diagrams showing for explaining shapes of an ellipsoidal reflector 114 and an auxiliary mirror 116 in the exemplary embodiment. FIG. 2(a) is a plan view, FIG. 2(b) is a side view, FIG. 2(c) is a diagram viewed from a side of a region to be illuminated, and FIG. 2(d) is a perspective view.

The arc tube 112 comprises a light emitting portion including a light emitting center and a pair of seal portions extending from both ends of the light emitting portion.

A reflective concave surface of the ellipsoidal reflector 114 has an ellipsoid of revolution shape with a first focal point and a second focal point.

The ellipsoidal reflector 114 is mounted on the one of the pair of seal portions so that the first focal point of the ellipsoidal reflector 114 approximately conforms to the light emitting center of the arc tube 112.

The ellipsoidal reflector 114 reflects the light emitted from the emitting portion of the arc tube 112 to converge on the second focal point.

A reflective concave surface of the auxiliary mirror 116 has a sphere shape.

The auxiliary mirror 116 is mounted on the other of the pair of seal portions so that the center of curvature of the auxiliary mirror 116 approximately conforms to the light emitting center of the arc tube 112.

The auxiliary mirror 116 reflects the light emitted from the emitting portion of the arc tube 112 to the region on to be illuminated (the opposite side to the ellipsoidal reflector 114) toward the light emission portion.

The other words, the auxiliary mirror 116 reflects the light toward the light emitting portion whereby the light reflected by the auxiliary mirror 116 head to the ellipsoidal reflector 114 through the arc tube 112. Further the light converges on the second focal point of the ellipsoidal reflector 114 by reflecting on the ellipsoidal reflector 114.

In a projector 1000 according to the exemplary embodiment, an auxiliary mirror 116 has a shape in which a reflection concave surface is partially removed so that a length along a y-axis direction in a cross section of a luminous flux on a light incident surface of the first lens array 120 may become shorter than that along an x-axis direction.

That is, when small lenses 122 having a rectangular shape with a ratio of a vertical dimension along a y-axis direction: a horizontal dimension along an x-axis direction=1:4 are arranged within rectangular regions with a length in a horizontal direction: a length in a vertical direction=2:1 in a plane perpendicular to an illumination optical axis 100ax that is a center axis of the luminous flux, the auxiliary mirror 116 has a longer direction in a vertical direction. Thereby, the auxiliary mirror 116 works so as to compress the luminous flux in a vertical direction.

Accordingly, a shape of a cross section of the luminous flux reflected by the ellipsoidal reflector 114 becomes a shape smaller in a vertical direction along a y-axis direction compared with a horizontal direction along an x-axis direction.

As a result, the shape of a cross section of the luminous flux reflected by the ellipsoidal reflector 114 becomes excellently compatible with a rectangular region where in the first lens array 120 individual small lenses 122 are arranged so that a length in a horizontal direction: a length in a vertical direction may be 2:1, and thereby light exited from the light source device 100 can be effectively utilized.

Furthermore, since vertical dimensions along the y-axis direction in the individual optical elements in the latter part including a concave lens 118, a first lens array 120, a second lens array 130, a polarization conversion element 140 and a superposing lens 150 can be made smaller, the apparatus as a whole can be made smaller in size.

In the projector 1000 according to the exemplary embodiment, the ellipsoidal reflector 114, as shown in FIGS. 1 and 2, has a shape in which, when light emitted from a light emitting portion is assumed to go through the auxiliary mirror 116 without being reflected, a portion of a reflection concave surface necessary for reflecting light that goes through without being reflected by the auxiliary mirror 116 is removed. In other words, in the case of the auxiliary mirror 116 having a shape having a longer length direction in a vertical direction along a y-axis direction, the ellipsoidal reflector 114 has a shape having a longer length direction in a horizontal direction along an x-axis direction. Accordingly, a vertical dimension along a y-axis direction of the ellipsoidal reflector 114 can be shortened, resulting in miniaturizing the whole apparatus.

2. First Lens Array and Polarization Conversion Element

In the beginning, a first lens array 120 will be detailed with reference to FIGS. 3 through 5.

Figure 3A:
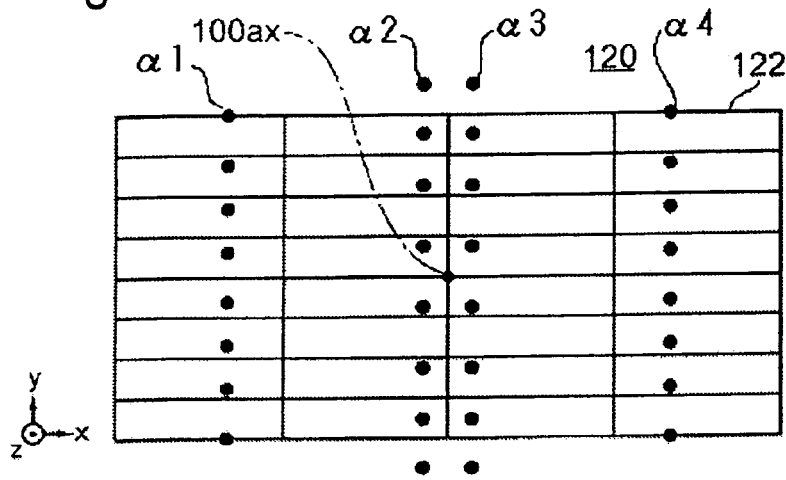
FIGS. 3(a) through 3(c) are diagrams showing for explaining a structure of a first lens array in the exemplary embodiment.
Figure 3C:
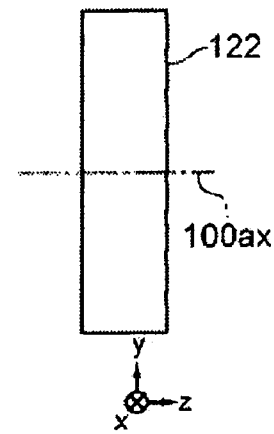
Figure 3B:
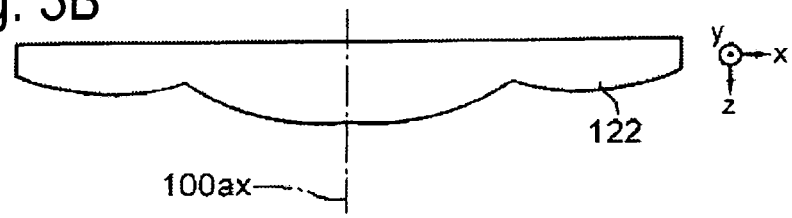

FIGS. 3(a) through 3(c) are diagrams for explaining a structure of the first lens array in the exemplary embodiment. FIG. 3(a) is a diagram viewed from a direction along a z-axis direction, FIG. 3(b) being a diagram viewed from a direction along a y-axis direction, FIG. 3(c) being a diagram viewed from a direction along an x-axis direction.

Figure 4A:
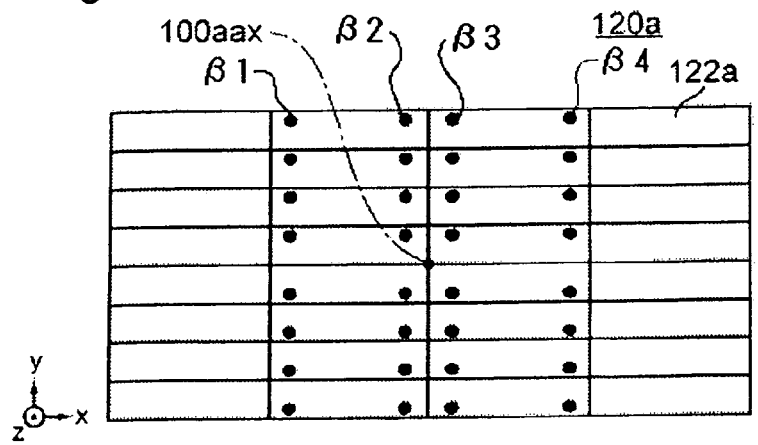
FIGS. 4(a) through 4(c) are diagrams showing for explaining a structure of a first lens array according to a comparative example of the exemplary embodiment.
Figure 4C:
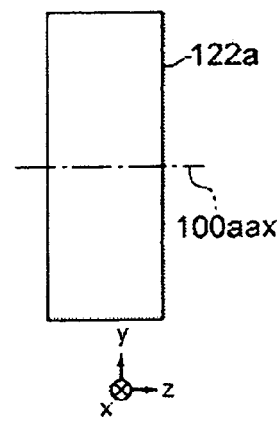
Figure 4B:
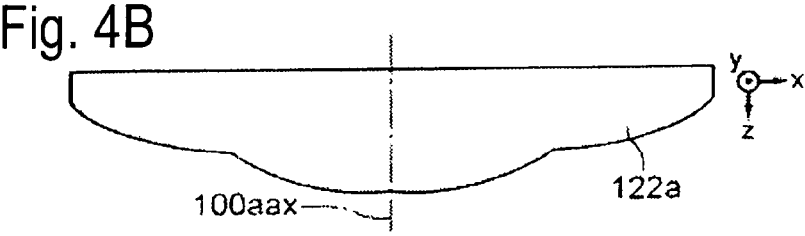

FIGS. 4(a) through 4(c) are diagrams for explaining a structure of a first lens array according to a comparative example of the exemplary embodiment. FIG. 4(a) is a diagram viewed from a direction along a z-axis direction, FIG. 4(b) being a diagram viewed from a direction along a y-axis direction, FIG. 4(c) being a diagram viewed from a direction along an x-axis direction.

Figure 5A:
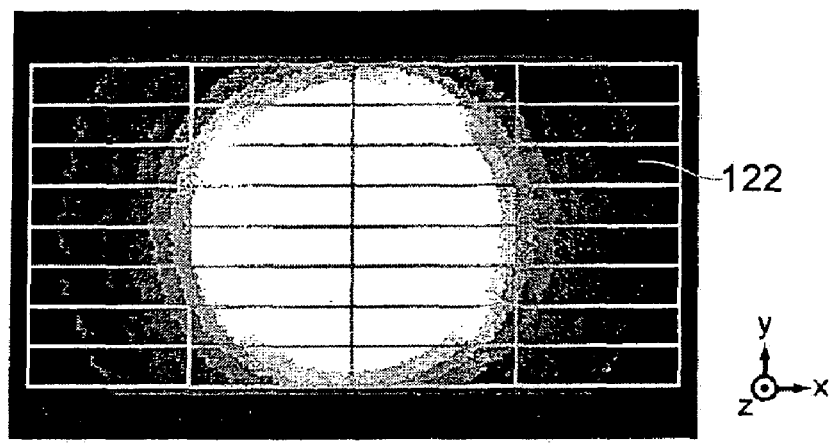
FIGS. 5(a) and 5(b) are diagrams showing, with contour lines, a light intensity distribution in a cross section of a luminous flux.
Figure 5B:
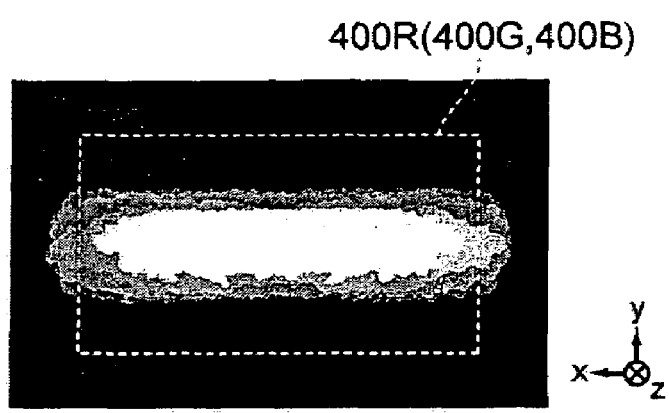

FIGS. 5(a) and 5(b) are diagrams showing a light intensity distribution in a cross section of a luminous flux with contour lines. FIG. 5(a) is a diagram showing a light intensity distribution of a luminous flux in a light incident surface of the first lens array. FIG. 5(b) is a diagram showing a light intensity distribution of a luminous flux on an image formation region of a liquid crystal device.

Black points shown in FIGS. 3(a) and 4(a) show optical axes of the individual small lenses.

An arrangement of a plurality of small lenses 122 will be detailed.

In order to more uniformly illuminate an illumination region, a luminous flux from the light source device 100 is preferably split into more many partial light fluxes to superpose on the illumination region. However, a pitch of light source images has to be secured so that light source images that the partial light fluxes split by individual small lenses 122 of the first lens array 120 form may not be overlapped each other on the second lens array 130, and the number of the light source images has to be limited so that a size of an optical system after the second lens array 130 may not be excessively large. That is, the number of the small lenses 122 is limited. When the light source images are overlapped each other, into small lenses of the second lens array 130 respectively corresponding to the partial light fluxes split by the first lens array 120, partial light fluxes that do not correspond thereto are input, and the partial light fluxes that do not correspond thereto are not effectively superposed.

When small lenses 122 having a planar shape of a rectangle in which a ratio of a vertical dimension along a y-axis direction to a horizontal dimension along an x-axis direction is 1:4 are arranged with an x-axis direction as a column and a y-axis direction as a row, pitches of the light source images formed by the partial light fluxes split into the number corresponding to the small lenses 122 are narrower in the row direction in comparison with the column direction.

The first lens array 120, as shown in FIG. 3, has a plurality of small lenses 122 arranged in 4 columns·8 rows with an illumination optical axis 100ax interposed therebetween.

Accordingly, since the number of a plurality of partial light fluxes can be secured enough, as shown in FIG. 4(b), a light intensity distribution in each of regions to be illuminated of the liquid crystal devices 400R, 400G and 400B can be homogenized to some extent. Furthermore, since a plurality of small lenses 122 in the first lens array 120 is arranged in 4 columns along an x-axis direction and in 8 rows along a y-axis direction, so that partial light fluxes emitted from the individual small lenses 122 of the first lens array 120 may be efficiently taken in by the corresponding second lens array 130, a dimension of the small lenses 122 can be secured. Accordingly, of light illuminating an illumination region to light emitted from the light source device 110, excellent light availability can be obtained.

The plurality of small lenses 122 in the first lens array 120, as shown in FIG. 3(a), has a planar shape of a rectangle in which a ratio of a vertical dimension along a y-axis direction to a horizontal dimension along an x-axis direction is 1:4. Accordingly, the first lens array 120 can make a luminous flux emitted from the illumination device 100 a luminous flux having a sectional shape that, as shown in FIG. 5(b), illuminates, in an image formation region of each of the liquid crystal devices 400R, 400G and 400B, an entirety of the image formation region of a horizontal direction along an x-axis direction and a part (substantially one half) in the image formation region of a vertical direction along a y-axis direction.

In a projector 1000 according to the exemplary embodiment, in a region where in a length along an x-axis direction: a length along a y-axis direction, as shown in FIG. 3(a), a length in a horizontal direction to a length in a vertical direction is 2:1, a plurality of small lenses 122 of the first lens array 120 is arranged. That is, a ratio of a length along a y-axis direction to a length along an x-axis direction in an incident surface of the first lens array 120 is 50%.

Accordingly, since the ratio is 30% or more, thereby the light availability of the luminous flux reflected by the ellipsoidal reflector 114 can be maintained and the number of columns of the small lenses 122 in the first lens array 120 can be secured; as a result, the light intensity distribution on the liquid crystal devices 400R, 400G and 400B can be homogenized. Furthermore, since the ratio is 80% or less, the apparatus can be made smaller in size.

In the projector 1000 according to the exemplary embodiment, the first lens array 120 has a light incidence surface toward the ellipsoidal reflector 114 than a second point of focus of the ellipsoidal reflector 114 and is disposed at a position where an amount of light of the luminous flux emitted from the light source device 110 distribute over an entirety of the light incidence surface. Accordingly, as shown in FIG. 5(a), the amount of light of the luminous flux emitted from the light source device 110 distributes over an entirety on the light incidence surface of the first lens array 120. As a result, even when the small lenses 122 are arranged in 4 columns to form a first lens array 120 low in the lens density, without deteriorating the in-plane light intensity distribution characteristics on the regions to be illuminated of the liquid crystal devices 400R, 400G and 400B, in the first lens array, the manufacturing process can be simplified and the cost can be reduced.

In this case, the first lens array 120 is preferably disposed at a position where in a center portion of the light incidence surface of the first lens array 120 a region where incident light intensity is very small (a shadow region of an arc tube 112) may not exist. When configured thus, the amount of light of the luminous flux emitted from the light source device 110 distributes over an entire light incidence region of the first lens array 120.

As mentioned above, the small lenses 122 of the first lens array 120 according to exemplary embodiment have a planar shape of a rectangle in which a ratio of a vertical dimension along a y-axis direction to a horizontal dimension along an x-axis direction is 1:4. Accordingly, a plurality of partial light fluxes emitted from the first lens array 120, in comparison with an x-axis direction, is in more proximity to each other in a y-axis direction. Accordingly, in order that the partial light fluxes may more excellently enter the small lenses of the second lens array 130, a distance between the partial light fluxes on an incidence surface of the second lens array 130 is necessary to be larger than a distance between the partial light fluxes on an exit surface of the first lens array 120. In order to achieve this, in each of the small lenses 122 of the first lens array 120, a decentered lens is used. However, when a lens large in the eccentricity is used in each of the small lenses 122 of the first lens array 120, since shapes of the individual small lenses are largely different from each other, a large step may be generated between the small lenses and a thickness of the first lens array may be increased. Accordingly, other than that the first lens array can be manufactured with difficulty, a weight of the first lens array results in increasing.

However, in the exemplary embodiment, a luminous flux that is emitted from the light source device 110 and diverges with travel toward a region to be illuminated is incident on the first lens array 120. Accordingly, an amount of eccentricity of the small lenses 122 of the first lens array 120 can be suppressed for that part.

Now, with reference to a structure of a first lens array 120a in a projector according to a comparative example shown in FIG. 4, a structure of the first lens array 120 in the projector 1000 according to exemplary embodiment and an advantage thereof will be further described.

In a projector according to a comparative example (not shown in the drawing), individual small lenses 122a in the first lens array 120a, as shown in FIG. 4(a), in the small lenses 122a of the first through fourth columns, are equal in the amount of eccentricity in a y-axis direction. On the other hand, in the projector 1000 according to exemplary embodiment, in the individual small lenses 122 in the first lens array 120, as shown in FIG. 3(a) in comparison with amounts of eccentricity in a y-axis direction of the small lenses 122 in the first and fourth columns, amounts of eccentricity of the small lenses 122 in a y-axis direction in the second and third columns are larger. For instance, a distance from a lens center to an optical axis α2 of the small lens 122 in the second column from left in FIG. 3(a) is longer than a distance from a lens center to an optical axis α1 of the small lens 122 in the first column from left. This is because when a luminous flux that diverges with travel toward a region to be illuminated is emitted from the light source device 110, light in the vicinity of a center of the luminous flux incident on the first lens array 120, that is, light in the vicinity of an illumination optical axis 100ax, is smaller in an angle to the illumination optical axis 100ax than light in the periphery thereof; accordingly, when the first lens array is not a decentered lens, the partial light fluxes from the second and third columns of the first lens array 120 are not good in the isolation of the arc image in the vicinity of the second lens array, resulting in difficulty in easily improving the light availability. Accordingly, as mentioned above, the amounts of eccentricity of the small lenses 122 in a y-axis direction of the second and third columns are made larger than that of the small lenses 122 in a y-axis direction of the first and fourth columns, and thereby, the separation of the arc images becomes more excellent and the light availability can be readily improved. However, in the exemplary embodiment, since the luminous flux diverging with travel toward the region to be illuminated is emitted from the light source device 110, there is no need of the large eccentricity of the small lenses 122 of the first lens array 120. Accordingly, the manufacture of the first lens array 120 is not rendered difficult and a weight of the first lens array 120 does not increase so much.

Furthermore, in a projector according to the comparative example (not shown in the drawing), as shown in FIG. 4(a), optical axes β1 and β4 of the individual small lenses 122a in the first and fourth columns in the first lens array 120a are present in positions deviated from a width of the individual small lenses 122a in an x-axis direction. For instance, the optical axes β1 of the small lenses 122a in the column first from left in FIG. 4(a) are present within the small lenses in the column second from left. On the other hand, in the projector 1000 according to exemplary embodiment, as shown in FIG. 3(a), optical axes a1 through α4 of the individual small lenses 122 in the first lens array 120 are present within a width of the individual small lenses 122 in an x-axis direction.

This relates to a configuration of a polarization conversion element 140 of the present exemplary embodiment detailed below with reference to FIGS. 6 and 7.

Figure 6A:
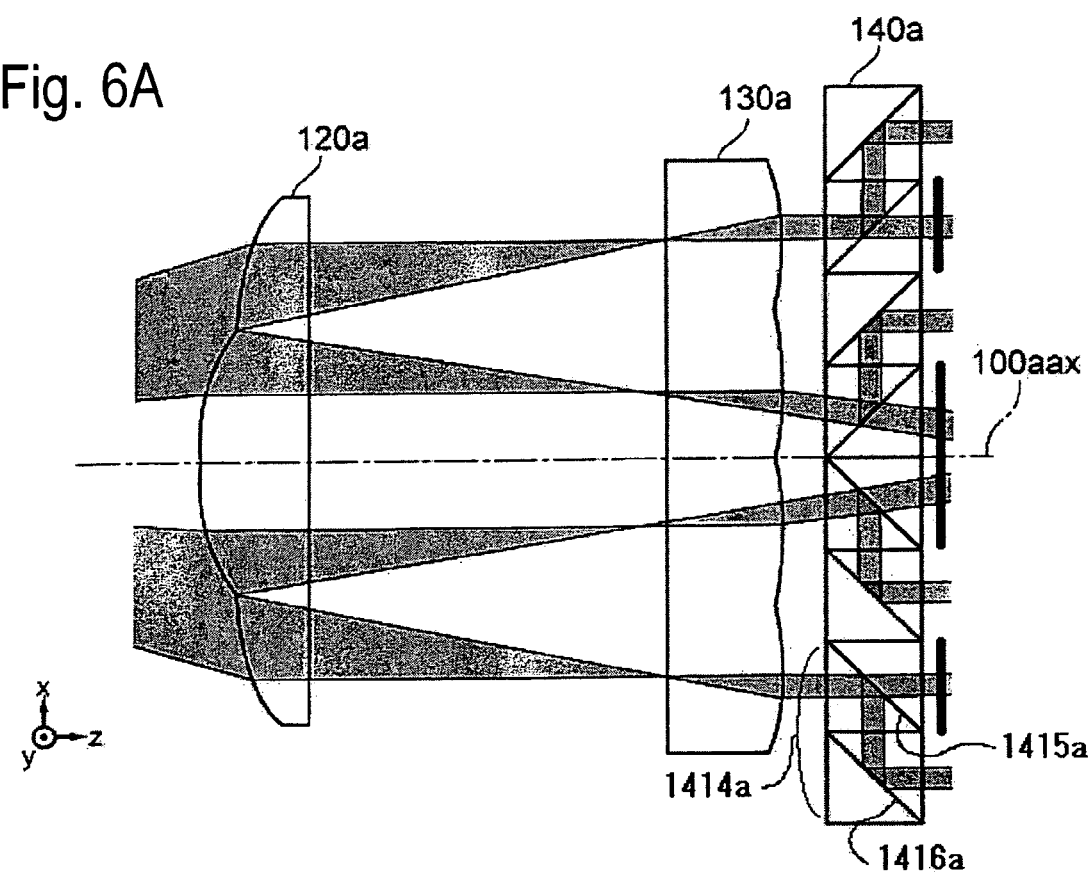
FIGS. 6(a) and (b) are diagrams showing for explaining a structure of a polarization conversion element in the exemplary embodiment.
Figure 6B:
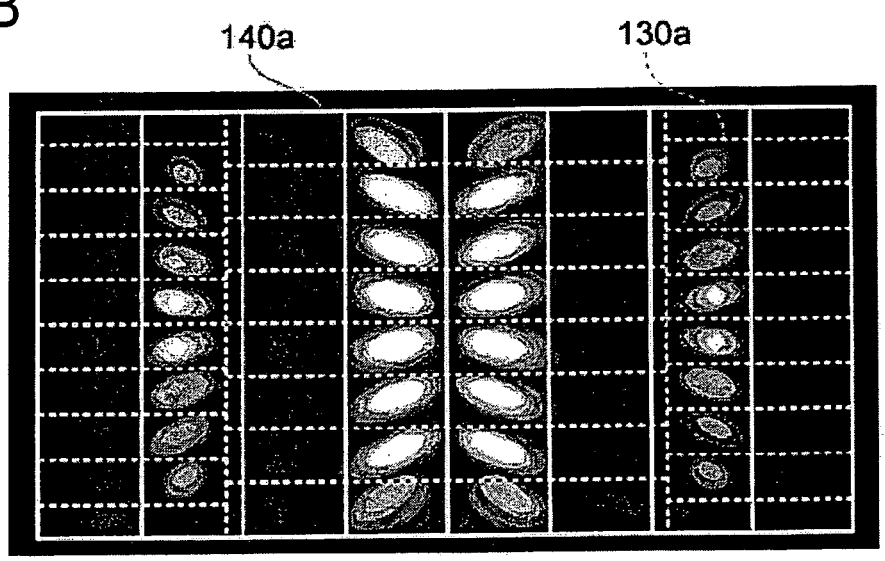

FIGS. 6(a) and 6(b) are diagrams showing for explaining a structure of a polarization conversion element 140 in the exemplary embodiment. FIG. 6(a) is a diagram schematically showing trajectories of light rays from the first lens array 120 to a polarization conversion element 140, and FIG. 6(b) is a diagram showing arc images in a second lens array 130 and the polarization conversion element 140.

Figure 7A:
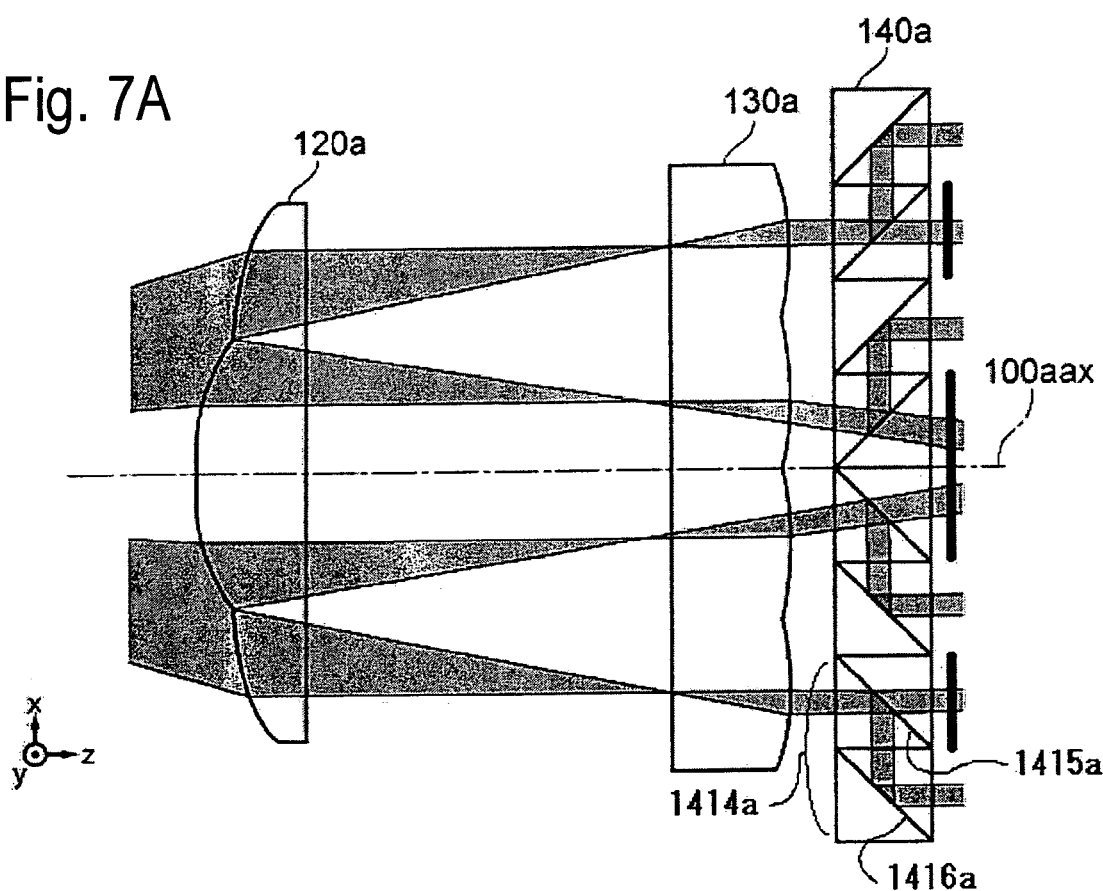
FIGS. 7(a) and 7(b) are diagrams showing for explaining a structure of a polarization conversion element in a comparative example of the exemplary embodiment.
Figure 7B:
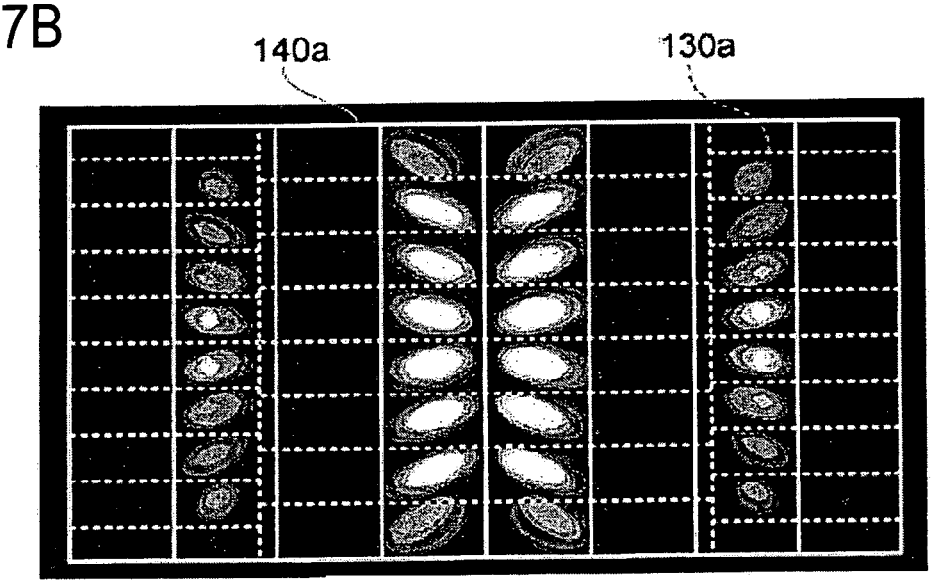

FIGS. 7(a) and 7(b) are diagrams showing for explaining a structure of a polarization conversion element 140a in a comparative example of the exemplary embodiment. FIG. 7(a) is a diagram schematically showing trajectories of light rays from the first lens array 120a to a polarization conversion element 140a, and FIG. 7(b) is a diagram showing arc images in a second lens array 130a and the polarization conversion element 140a.

The polarization conversion element 140, as shown in FIG. 6(a) is provided with a polarized light separating element 1411 that splits a luminous flux into a luminous flux involving a first polarized light component and a luminous flux involving a second polarized light component, and a phase plate that converts one of the luminous flux involving the first polarized light component and the luminous flux involving the second polarized light component into the other. The polarized light separating element 1411 includes a plurality of polarized light separating prisms 1413 and 1414. The polarized light separating prisms 1413 and 1414 each have a polarized light separating surface 1415 that allows the luminous flux involving the first polarized light component of two polarized light components contained in the luminous flux to go through intact and reflects the luminous flux involving the second polarized light component in a direction perpendicular to the illumination optical axis 100ax, a reflection surface 1416 that reflects the second polarized light component in a direction in parallel with the illumination optical axis 100ax. In the plurality of the polarized light separating prisms 1413 and 1414, corresponding to 4 columns of the plurality of small lenses 122 (FIG. 3) in the first lens array 120, the polarized light separating prisms 1413 are arranged on both sides and the polarized light separating prisms 1414 are arranged in the center, in total 4.

Now, in a projector according to a comparative example (not shown in the drawing), each of polarized light separating surfaces 1415a of polarized light separating prisms 1414a corresponding to the first through fourth columns of small lenses of a second lens array 130a, as shown in FIG. 7(a), is configured so as to reflect a luminous flux involving a second polarized light component in a direction receding from an illumination optical axis 100aax. On the other hand, in a projector 1000 according to exemplary embodiment, as shown in FIG. 6(a) each of polarized light separating surfaces 1415 in polarized light separating prisms 1413 corresponding to the first and fourth columns of the small lenses of a second lens array 130 is configured so as to reflect a luminous flux involving a second polarized light component in a direction approaching to an illumination optical axis 100ax.

In other words, in the polarized light separating element 140 according to the exemplary embodiment, the polarized light separating prisms 1413 that split luminous fluxes emitted from columns (first and fourth columns) on both end sides of the second lens array 130 (first lens array 120) have the polarized light separating surfaces 1415 at a position receding from the illumination optical axis 100ax than the reflection surfaces 1416. On the other hand, in the polarized light separating element 140a according to comparative example, the polarized light separating prisms 1414*a* that split luminous fluxes emitted from columns (first and fourth columns) on both end sides of the second lens array 130*a* (first lens array 120*a*) have the polarized light separating surfaces 1415*a* at a position closer to the illumination optical axis 100*aax* than the reflection surfaces 1416*a*.

Thereby, partial light fluxes going through the first and fourth columns in the second lens array 130, even when located at positions far apart more than ever from an illumination optical axis 100*ax*, can enter on the polarized light separating surface 1415 of the polarized light separating element 140. On the other hand, in the comparative example, in order to enter a luminous flux that is emitted from the light source device and diverges with travel toward a region to be illuminated on the polarized light separating surfaces 1415*a* of the polarized light separating prisms 1414*a* at both ends of the polarized light separating element, the first lens array 120*a* has to apply a large refractive force toward an illumination optical axis 100*aax* on the partial light flux. That is, in the comparative example, an amount of eccentricity of the small lens of the first lens array 120*a* has to be made larger.

Accordingly, since, different from ever, there is no need of the first lens array 120 applying a large refractive force toward an illumination optical axis 100*ax* on the luminous flux corresponding to the partial light flux, there is no need of largely decentering the small lenses 122 (FIG. 3) at the first and fourth columns in the first lens array 120. As a result, since a lens thickness of the first lens array 120 can be made thinner, the first lens array, resultantly, a projector can be made lighter in weight. Furthermore, when a lens thickness of the first lens array 120 can be made thinner, an annealing period when the first lens array is manufactured by use of press working can be shortened. Accordingly, the manufacturing time period can be shortened and the manufacturing cost can be reduced.

In the projector 1000 according to the exemplary embodiment, as shown in FIG. 6(*a*) the polarized light separating surfaces in the polarized light separating prisms at the second and third columns of the polarized light separating prisms are configured so as to reflect a luminous flux involving the second polarized light component in a direction receding from the illumination optical axis 100*ax*.

Accordingly, since, in the second lens array 130, partial light fluxes going through the small lenses in the first and fourth columns and partial light fluxes going through the small lenses in the second and third columns can be largely distanced, in the second lens array 130, the small lenses can be disposed largely distanced between the first column and second column and between the third column and fourth column. As a result, a lens function in an in-between portion can be made unnecessary.

3. Rotating Prism

Figure 8A:
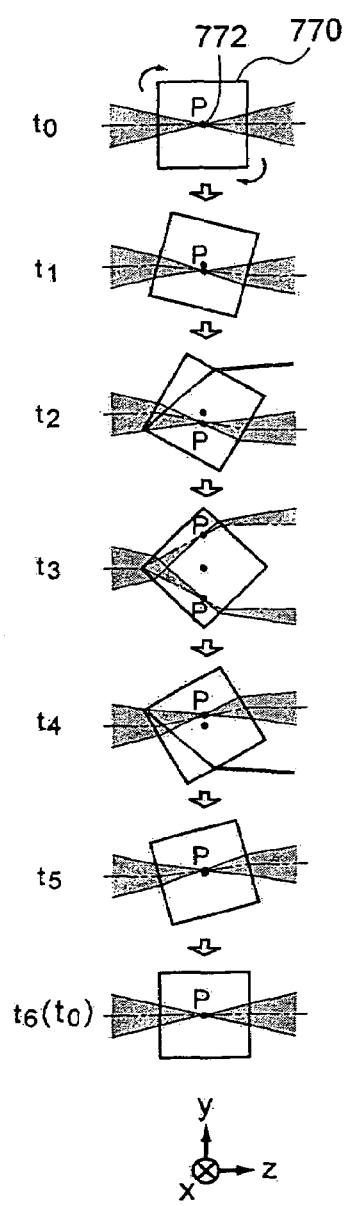
FIGS. 8(a) through (c) are diagrams showing relationship between rotation of a rotating prism and a state of illumination on a liquid crystal device.
Figure 8B:
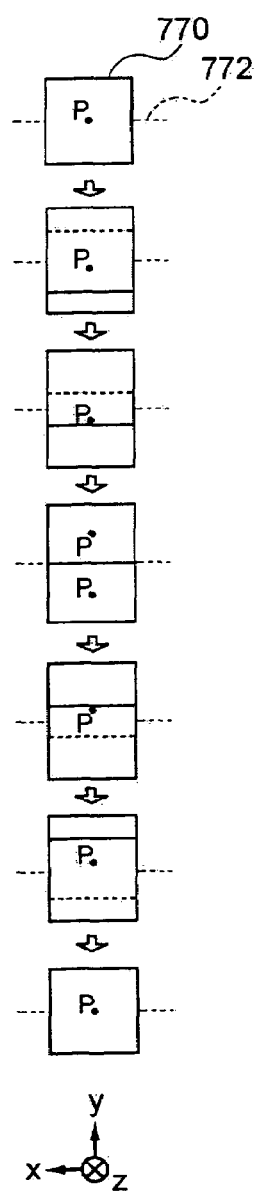
Figure 8C:
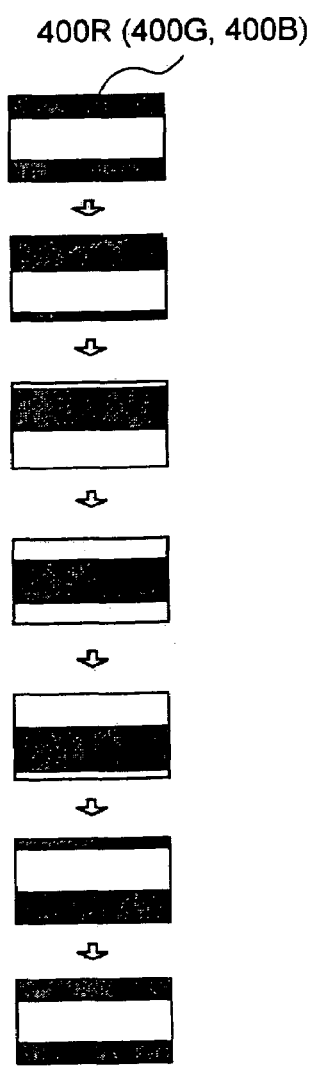

FIGS. 8(*a*) through 8(*c*) are diagrams showing relationship between a rotation of a rotating prism 770 and an illumination state on a liquid crystal device 400R (same as in 400G and 400B). FIG. 8(*a*) is a sectional view of a rotation prism 770 viewed along a rotation axis 772. FIG. 8(*b*) is a diagram of a rotation prism 770 viewed along an illumination optical axis 100*ax*. FIG. 8(*c*) is a diagram showing an illumination state of a luminous flux on an image formation region of a liquid crystal device 400R (same as in 400G and 400B).

A situation where, as shown in FIGS. 8(*a*) and 8(*b*) an image P of a virtual center point of an illuminated region where partial light fluxes emitted from a first lens array 120 are superposed on an illumination optical axis 100*ax*, as a rotating prism 770 rotates, is scrolled in a direction (up and down direction) substantially perpendicular to the rotation axis 772 with the rotation axis 772 of the rotating prism 770 as a center is shown. As a result, as shown in FIG. 8(*c*) when the rotating prism 770 rotates, on an image formation region on each of the liquid crystal devices 400R, 400G and 400B, a light illuminated region and a light non-illuminated region are sequentially and alternately scrolled.

In the above, the configuration and the features of the projector 1000 according to the exemplary embodiment are described. However, as mentioned above, according to the projector 1000 according to the exemplary embodiment, a luminous flux having a sectional shape that allows illuminating, of vertical and horizontal directions in an image formation region of each of the liquid crystal devices 400R, 400G and 400B, an entirety of an image formation region in a horizontal direction along an x-axis direction and a part of the image formation region in a vertical direction along a y-axis direction (that is, a sectional shape compressed in a vertical direction) can be scanned in synchronization with a frame rate of the liquid crystal device along a vertical direction on the image formation region; accordingly, in the image formation region of each of the liquid crystal devices 400R, 400G and 400B, an illuminated region and a non-illuminated region are sequentially and alternately scrolled. As a result, since the persistence of vision can be alleviated, a projector that can display a smooth and excellent moving picture can be obtained.

Furthermore, according to the projector 1000 according to exemplary embodiment, a luminous flux having a sectional shape compressed in a vertical direction as mentioned above is realized by use of a lens array in which a planar shape of each of the small lenses 122 is compressed in a vertical direction as the first lens array 120. Accordingly, different from a case where a light shutter is used, a luminous flux emitted from the light source device 110 can be efficiently introduced to the image formation regions of the liquid crystal devices 400R, 400G and 400B, resulting in avoiding to be largely deteriorated in the light availability.

As a result, the projector 1000 according to the exemplary embodiment, even when it is enabled to obtain a smooth and excellent moving image, becomes a projector where the light availability is not largely deteriorated.

In the projector 1000 according to the exemplary embodiment, between the illumination device 100 and each of the liquid crystal devices 400R, 400G and 400B, a color separating optical system 200 for separating a luminous flux emitted from the light illumination device 100 into a plurality of color lights is further included, and as the liquid crystal device a plurality of liquid crystal devices 400R, 400G and 400B that modulates a plurality of color lights emitted from the color separating optical system 200 in accordance with image information corresponding to the respective color lights is disposed. As a result, a projector in which, even when a smooth and excellent moving image is enabled to obtain, the light availability is not so much deteriorated can be rendered a three-panel type full-color projector excellent in image quality.

In the projector 1000 according to the exemplary embodiment, on a light transmissive surface of the rotating prism 770, a reflection reducing film is formed. Accordingly, since the light transmittance in the rotating prism 770 is improved, the light availability can be minimized in the deterioration and a stray light level decreases to improve the contrast.

Figure 9A:
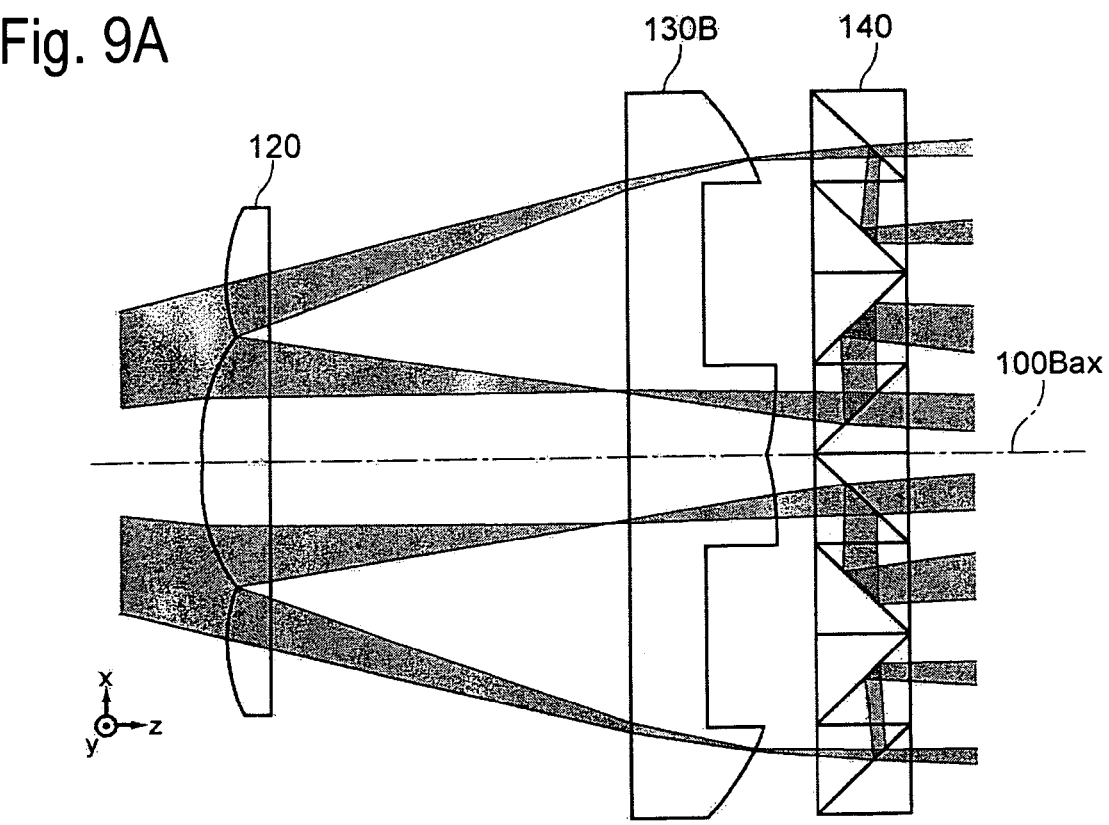
FIGS. 9(a) and 9(b) are diagrams showing for explaining a structure of a second lens array in an exemplary embodiment.
Figure 9B:
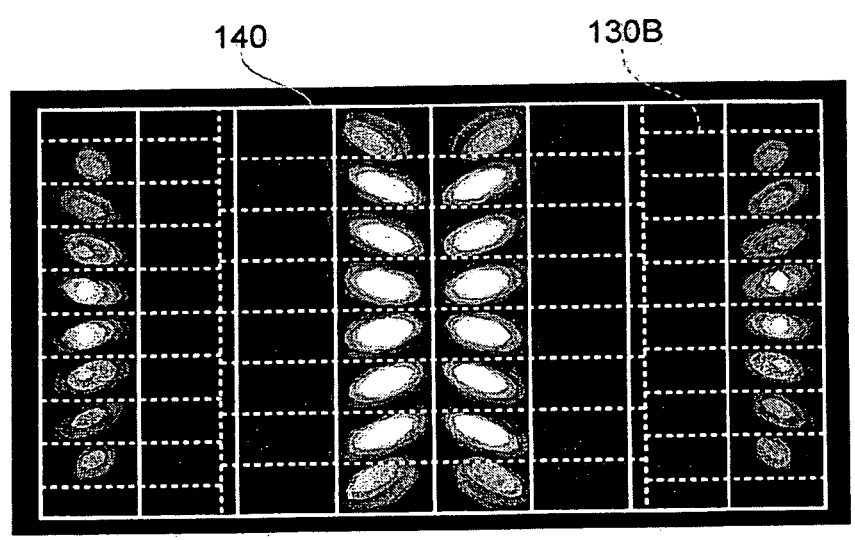

FIGS. 9(*a*) and 9(*b*) are diagrams showing for explanation of a structure of a second lens array in an exemplary embodiment. FIG. 9(*a*) is a diagram schematically showing a trajectory of a light ray from a first lens array to a polarization conversion element, and FIG. 9(*b*) is a diagram showing arc images in the second lens array and the polarization conversion element. In FIGS. 9(a) and 9(b) members same as that of FIGS. 6(a) and 6(b) are given the same reference numerals and detailed descriptions thereof will be omitted.

A projector 1000B (not shown in the drawing) according to another exemplary embodiment, as shown in FIG. 9(a) is different in a structure of the second lens array from the projector 1000 according to the previous exemplary embodiment.

That is, in the projector 1000B according to the exemplary embodiment, of small lenses of a second lens array 130B, between small lenses in the first column and small lenses in the second column and between small lenses in the third column and small lenses in the fourth column, a concave surface portion is disposed. Accordingly, a second lens array, resultantly a projector can be made lighter in weight. Furthermore, by disposing such a concave surface portion, a cooling time period during the manufacture of the second lens array can be shortened, and thereby a manufacturing time period can be shortened and the manufacturing cost can be reduced.

Thus, the projector 1000B according to the exemplary embodiment is different in a structure of the second lens array from the projector 1000 according to the prior exemplary embodiment. However, similarly to the case of the projector 1000 according to the prior exemplary embodiment, a luminous flux having a sectional shape that allows illuminating, of vertical and horizontal directions in an image formation region of each of the liquid crystal devices 400R, 400G and 400B (not shown in the drawing), an entirety of an image formation region in a horizontal direction along an x-axis direction and a part of the image formation region thereof in a vertical direction along a y-axis direction (that is, a sectional shape compressed in a vertical direction) is made capable of scanning in a vertical direction on the image formation region in synchronization with a frame rate of the liquid crystal device; accordingly, in the image formation region of each of the liquid crystal devices 400R, 400G and 400B, an illuminated region and a non-illuminated region are sequentially and alternately scrolled. As a result, since the persistence of vision can be alleviated, a projector that can display a smooth and excellent moving picture can be obtained.

Furthermore, according to the projector 1000B according to the exemplary embodiment, a luminous flux having a sectional shape compressed in a vertical direction as mentioned above is realized by use of, as the first lens array 120, a lens array in which a planar shape of each of the small lenses 122 is compressed in a vertical direction. Accordingly, different from a case where a light shutter is used, a luminous flux emitted from the light source device 110 (not shown in the drawing) can be efficiently introduced to each of the image formation regions of the liquid crystal devices 400R, 400G and 400B, resulting in avoiding to be largely deteriorated in the light availability.

As a result, the projector 1000B according to the exemplary embodiment, even when it is enabled to display a smooth and excellent moving image, becomes a projector where the light availability is not so much deteriorated.

Figure 10A:
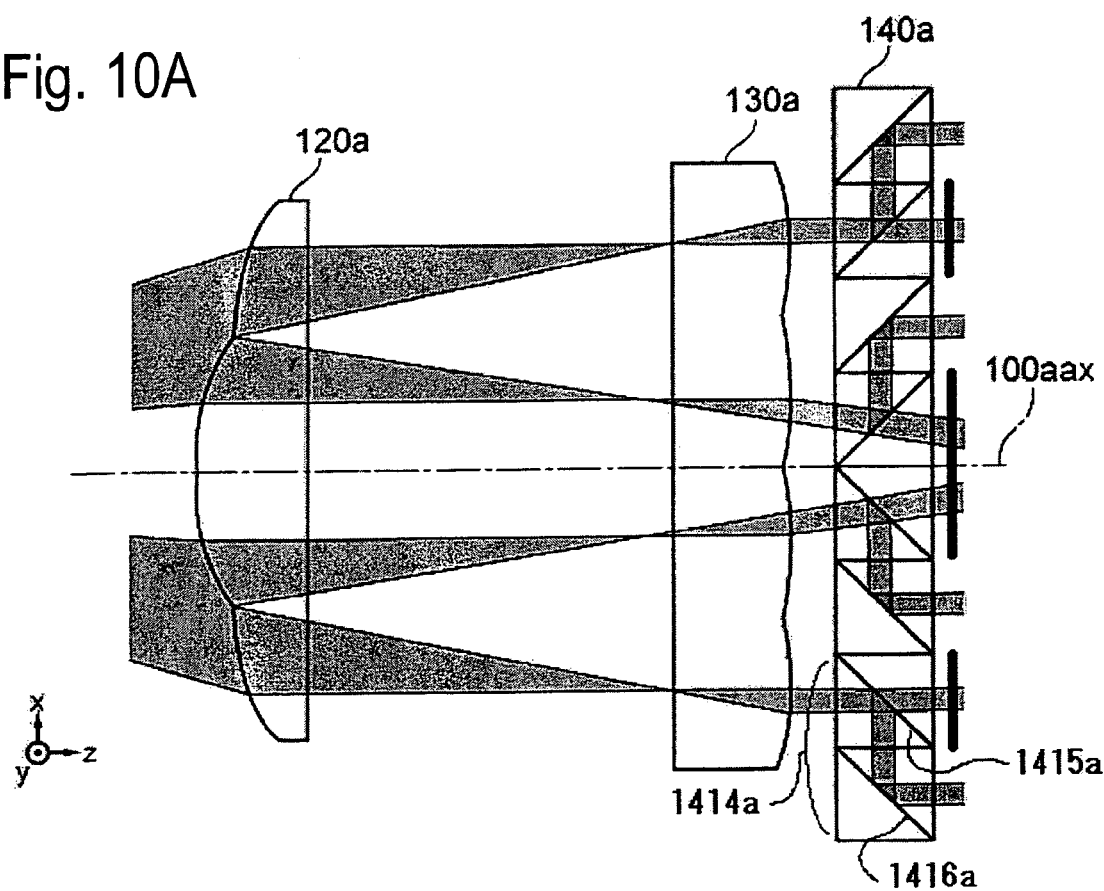
FIGS. 10(a) and 10(b) are diagrams showing for explaining a structure of a second lens array in an exemplary embodiment.
Figure 10B:
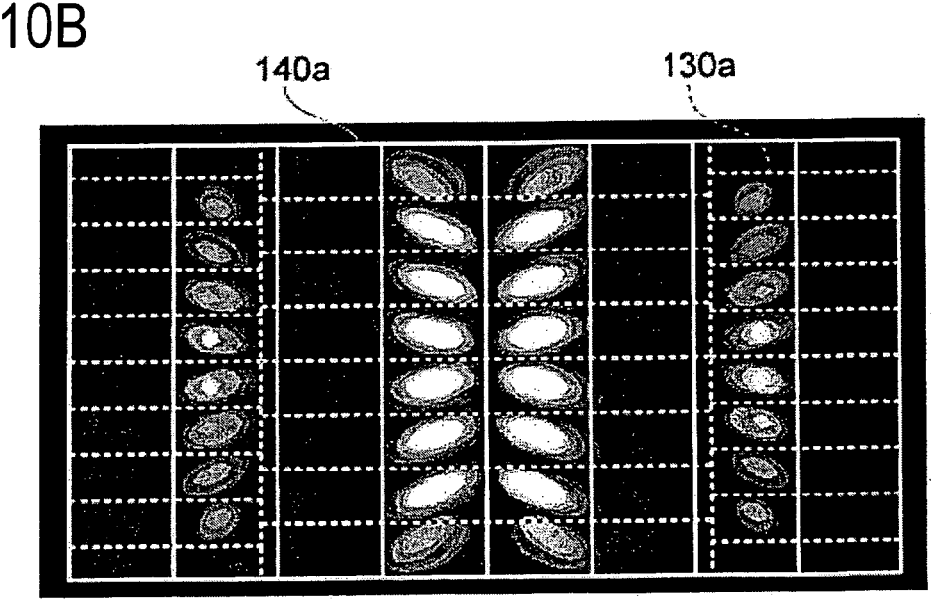

FIGS. 10(a) and 10(b) are diagrams showing for explanation of a structure of a second lens array in an exemplary embodiment. FIG. 10(a) is a diagram schematically showing a trajectory of a light ray from a first lens array to a polarization conversion element, and FIG. 10(b) is a diagram showing arc images in the second lens array and the polarization conversion element. In FIGS. 10(a) and 10(b) members same as that of FIGS. 6(a) and 6(b) are given the same reference numerals and detailed descriptions thereof will be omitted.

A projector 1000C (not shown in the drawing) according to another exemplary embodiment, as shown in FIG. 10(a), is different in a structure of the second lens array from the projector 1000 according to the prior exemplary embodiment. That is, in the projector 1000C according to the exemplary embodiment, of small lenses of a second lens array 130C, between small lenses in the first column and small lenses in the second column and between small lenses in the third column and small lenses in the fourth column, a smooth connection is formed. Accordingly, since there is no need of forming this portion into a precise lens, the manufacturing cost of a mold when the second lens array is manufactured by press working can be reduced.

Thus, the projector 1000C according to this exemplary embodiment is different in a structure of the second lens array from the case of the projector 1000 according to the prior embodiment. However, similarly to the case of the projector 1000 according to the prior embodiment, a luminous flux having a sectional shape that allows illuminating, of vertical and horizontal directions in an image formation region of each of the liquid crystal devices 400R, 400G and 400B (not shown in the drawing), an entirety of an image formation region in a horizontal direction along an x-axis direction and a part of the image formation region thereof in a vertical direction along a y-axis direction (that is, a sectional shape compressed in a vertical direction) is made capable of scanning along a vertical direction on the image formation region in synchronization with a frame rate of the liquid crystal device; accordingly, in the image formation region of each of the liquid crystal devices 400R, 400G and 400B, an illuminated region and a non-illuminated region are sequentially and alternately scrolled. As a result, since the persistence of vision can be alleviated, a projector that can display a smooth and excellent moving picture can be obtained.

Furthermore, according to the projector 1000C according to this exemplary embodiment, a luminous flux having a sectional shape compressed in a vertical direction as mentioned above is realized by use of, as the first lens array 120, a lens array in which a planar shape of each of the small lenses 122 is compressed in a vertical direction. Accordingly, different from a case where a light shutter is used, a luminous flux emitted from the light source device 10 (not shown in the drawing) can be efficiently introduced to each of the image formation regions of the liquid crystal devices 400R, 400G and 400B, resulting in avoiding to be largely deteriorated in the light availability.

As a result, the projector 1000C according to the exemplary embodiment, even when it is enabled to display a smooth and excellent moving image, becomes a projector where the light availability is not so much deteriorated.

Figure 11A:
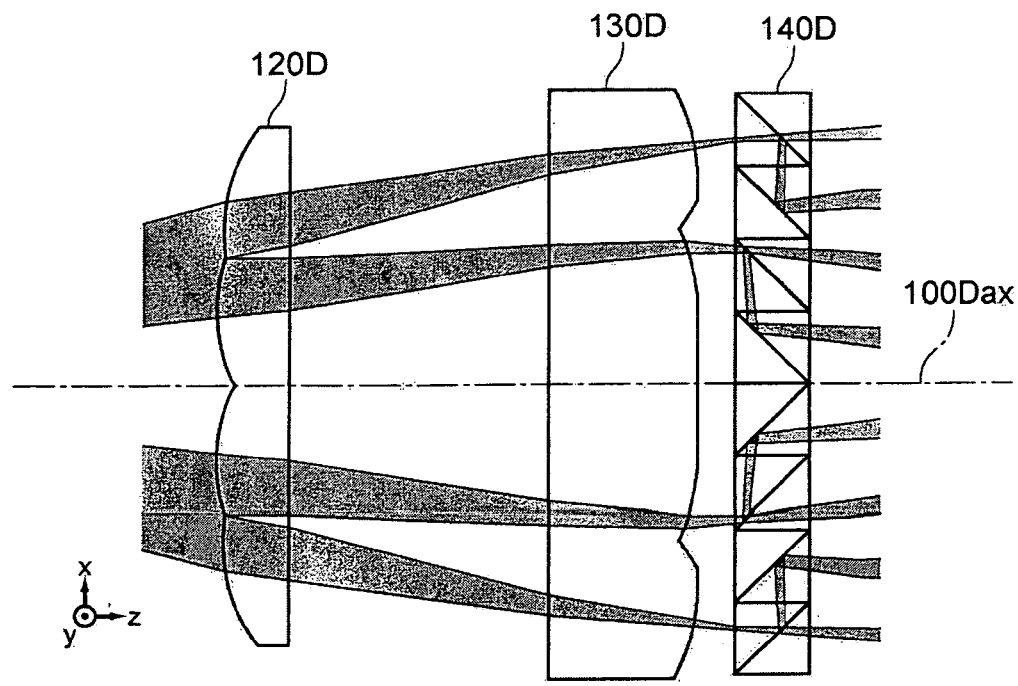
FIGS. 11(a) and 11(b) are diagrams showing for explaining structures of a first lens array, a second lens array and a polarization conversion element in an exemplary embodiment.
Figure 11B:
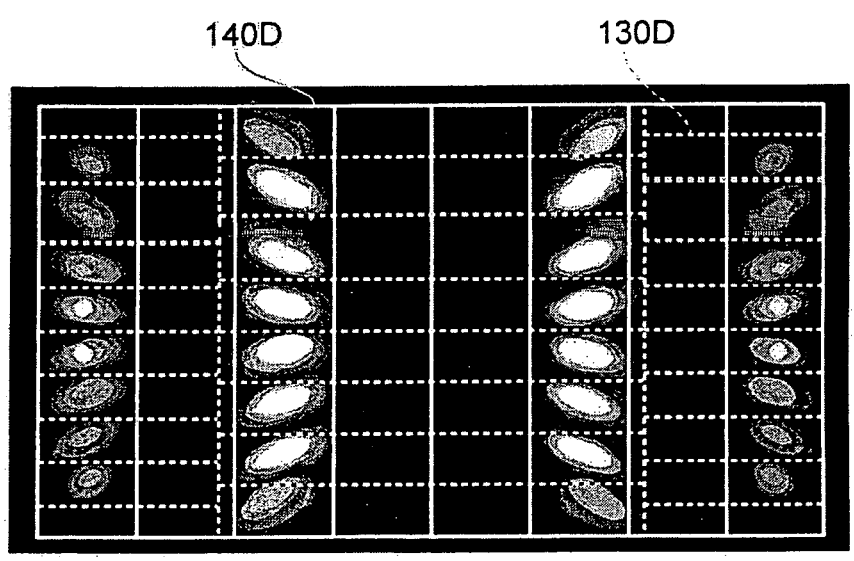
Figure 13A:
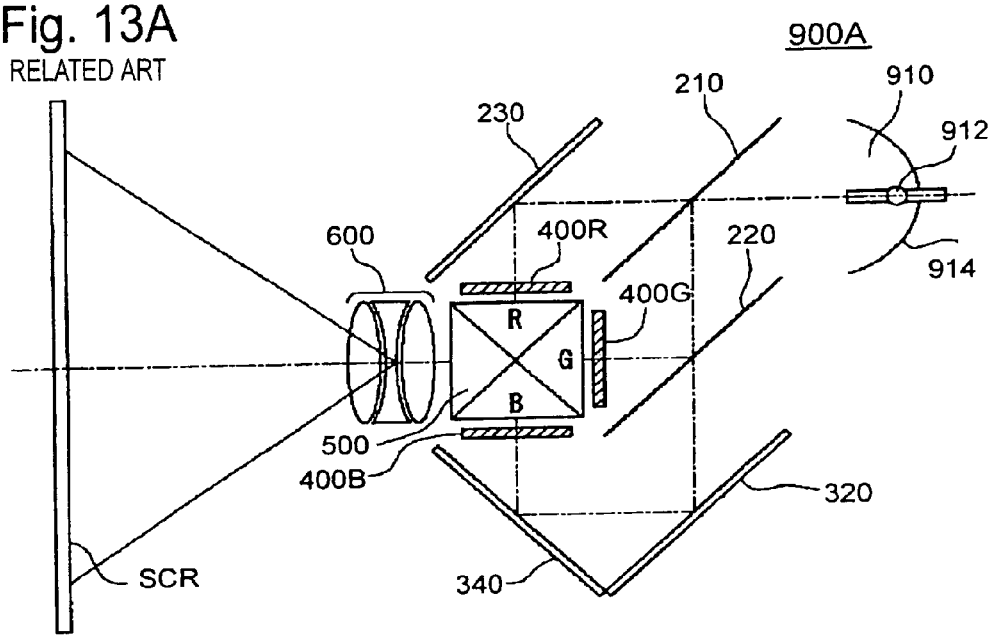
FIGS. 13(a) through 13(c) are diagrams showing for explaining a related art projector.
Figure 13B:
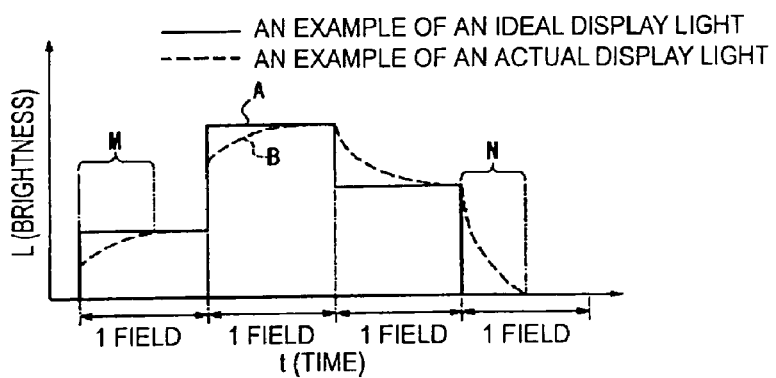
Figure 13C:
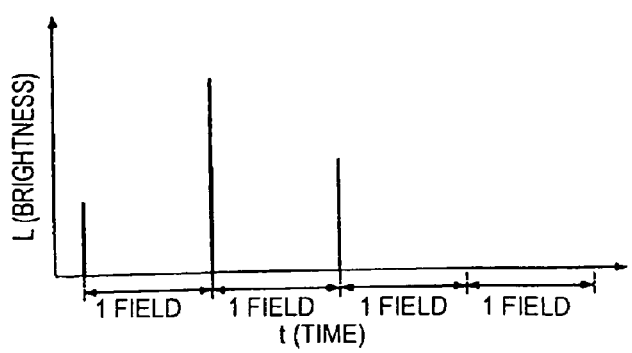
Figure 14A:
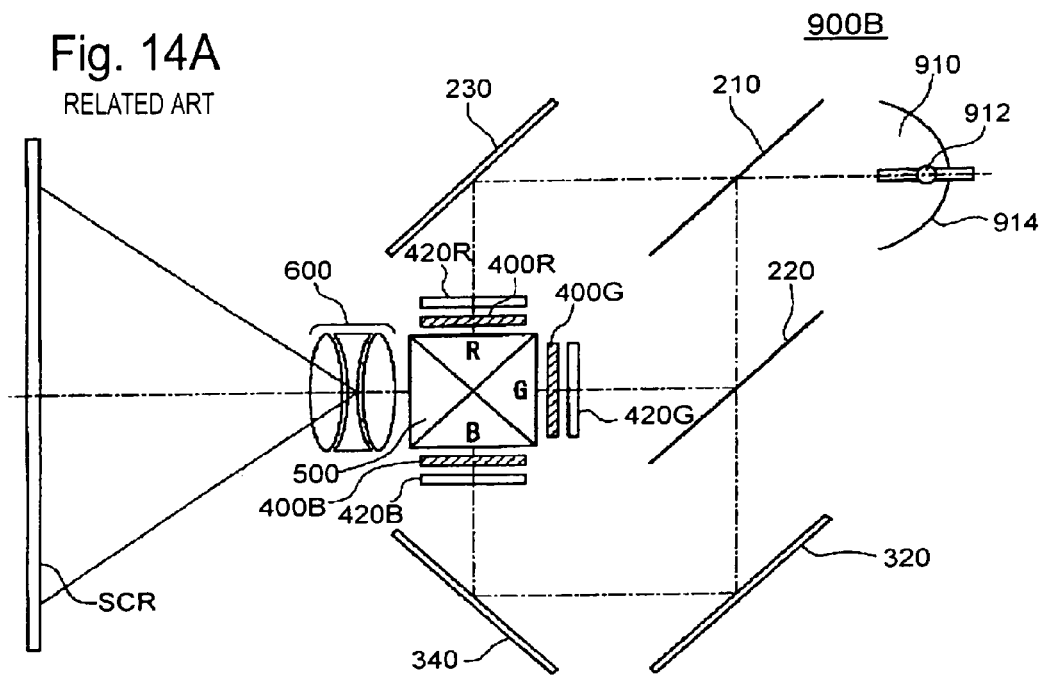
FIGS. 14(a) through 14(c) are diagrams showing for explaining another related art projector.
Figure 14B:
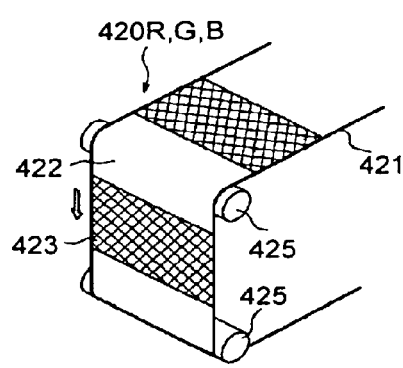
Figure 14C:
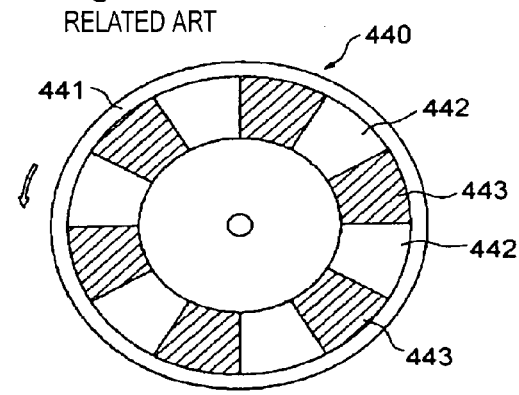

FIGS. 11(a) and 11(b) are diagrams showing for explaining structures of a first lens array, a second lens array and a polarization conversion element in another exemplary embodiment. FIG. 11(a) is a diagram schematically showing a trajectory of a light ray from the first lens array to the polarization conversion element, and FIG. 11(b) is a diagram showing arc images in the second lens array and the polarization conversion element.

A projector 1000D according to the exemplary embodiment (not shown in the drawing), as shown in FIG. 11(a) is different in a configuration of a polarization conversion element from the projector 1000 according to the prior exemplary embodiment. In accordance with the difference in the configuration of the polarization conversion element, structures of the first lens array and the second lens array are different therefrom as well.

That is, in the projector 1000 according to the prior exemplary embodiment, as mentioned above, the polarized light separating surfaces in polarized light separating prisms in the second and third columns of the polarized light separating prisms are configured so as to reflect luminous fluxes involving the second polarized light component in a direction receding from the illumination optical axis 100ax. On the other hand, in the projector 1000D according to the exemplary embodiment, the polarized light separating surfaces of the polarized light separating prisms in the second and third columns of the polarized light separating prisms are configured so as to reflect luminous fluxes involving the second polarized light component in a direction approaching the illumination optical axis 100Dax.

Thus, the projector 1000D according to the exemplary embodiment is different in the configuration of the polarization conversion element from the case of the projector 1000 according to the prior exemplary embodiment. However, similarly to the case of the projector 1000 according to the prior exemplary embodiment, polarized light separating surfaces in the polarized light separating prisms in the first and fourth columns are configured so as to reflect luminous fluxes involving the second polarized light component in a direction approaching the illumination optical axis 100Dax. Accordingly, partial light fluxes going past the small lenses in the first and fourth columns in the second lens array 130D locate at positions receding more than ever from the illumination optical axis 100Dax.

Accordingly, there is no need of the first lens array 120D applying a large refractive force toward an illumination optical axis 100Dax on the luminous flux corresponding to the partial light flux, there is no need of largely decentering the small lenses 122D (not shown in the drawing) in the first and fourth columns in the first lens array 120D. As a result, since a lens thickness of the first lens array 120D can be made thinner, the first lens array, resultantly, a projector can be made lighter in weight. Furthermore, since a lens thickness of the first lens array 120D can be made thinner, a cooling time period when the first lens array is manufactured by use of press working can be shortened. Accordingly, the manufacturing time period can be advantageously shortened and the cost can be advantageously reduced.

In the projector 1000D according to the exemplary embodiment, a smooth connection is formed between the small lenses in the second and third columns of the small lenses of the second lens array 130D. Thereby, there is no need of forming this portion into a precise lens; accordingly, when the second lens array is manufactured by use of the press working, a manufacturing cost of a mold can be reduced.

In the projector 1000D according to the exemplary embodiment, a smooth connection is formed between the small lenses in the second and third columns of the small lenses of the second lens array 130D. However, instead of forming a smooth connection, a structure where a concave surface portion is disposed therebetween may be taken. Thereby, the second lens array, resultantly, a projector can be made lighter in weight. Furthermore, by disposing such a concave surface portion, a cooling time period when the second lens array is manufactured can be shortened. Accordingly, the manufacturing time period can be shortened and the cost can be reduced.

Thus, the projector 1000D according to the exemplary embodiment, is different in configurations of the first lens array, the second lens array and the polarization conversion element from the projector 1000 according to the prior exemplary embodiment. However, similarly to the case of the projector 1000 according to the prior exemplary embodiment, a luminous flux having a sectional shape that allows illuminating, of vertical and horizontal directions in an image formation region of each of the liquid crystal devices 400R, 400G and 400B (not shown in the drawing), an entirety of an image formation region in a horizontal direction along an x-axis direction and a part of the image formation region thereof in a vertical direction along a y-axis direction (that is, a sectional shape compressed in a vertical direction) is made capable of scanning along a vertical direction on the image formation region in synchronization with a frame rate of the liquid crystal device. Accordingly, in the image formation region of each of the liquid crystal devices 400R, 400G and 400B, an illuminated region and a non-illuminated region are sequentially and alternately scrolled. As a result, since the persistence of vision can be alleviated, a projector that can display a smooth and excellent moving picture can be obtained.

Furthermore, according to the projector 1000D according to the exemplary embodiment, a luminous flux having a sectional shape compressed in a vertical direction as mentioned above is realized by use of, as the first lens array 120D, a lens array in which a planar shape of each of the small lenses 122D is compressed in a vertical direction. Accordingly, different from a case where a light shutter is used, a luminous flux emitted from the light source device 110 (not shown in the drawing) can be efficiently introduced to each of the image formation regions of the liquid crystal devices 400R, 400G and 400B, resulting in avoiding to be largely deteriorated in the light availability.

As a result, the projector 1000D according to the exemplary embodiment, even when it is enabled to display a smooth and excellent moving image, becomes a projector where the light availability is not so much deteriorated.

FIGS. 12(*a*) and 12(*b*) are diagrams showing an optical system of a projector according to another exemplary embodiment. FIG. 12(*a*) is a diagram where the optical system is viewed from a top surface and FIG. 12(*b*) is a diagram where the optical system is viewed from a side surface.

A projector 1000E according to the exemplary embodiment, as shown in FIG. 12(*a*) is different in a configuration of a color separating optical system from the projector 1000 according to the prior exemplary embodiment. That is, in the projector 1000E according to the exemplary embodiment, as a color separating optical system 200B, in order that all directions in which an illuminated region and a non-illuminated region are scrolled on the individual liquid crystal devices 400R, 400G and 400B may be in the same direction, a double-relay optical system is used.

Thus, the projector 1000E according to the exemplary embodiment is different in a configuration of the color separating optical system from the projector 1000 according to the prior exemplary embodiment. However, similarly to the case of the projector 1000 according to the prior exemplary embodiment, a luminous flux having a sectional shape that allows illuminating, of vertical and horizontal directions in an image formation region of each of the liquid crystal devices 400R, 400G and 400B (not shown in the drawing), an entirety of an image formation region in a horizontal direction along an x-axis direction and a part of the image formation region thereof in a vertical direction along a y-axis direction (that is, a sectional shape compressed in a vertical direction) is made capable of scanning in a vertical direction on the image formation region in synchronization with a frame rate of the liquid crystal device; accordingly, in the image formation region of each of the liquid crystal devices 400R, 400G and 400B, an illuminated region and a non-illuminated region are sequentially and alternately scrolled. As a result, since the persistence of vision can be alleviated, a projector that can display a smooth and excellent moving picture can be obtained.

Furthermore, according to the projector 1000E according to the exemplary embodiment, a luminous flux having a sectional shape compressed in a vertical direction as mentioned above is realized by use of, as the first lens array 120, a lens array in which a planar shape of each of the small lenses 122 is compressed in a vertical direction. Accordingly, different from a case where a light shutter is used, a luminous flux emitted from the light source device 110 can be efficiently introduced to each of the image formation regions of the liquid crystal devices 400R, 400G and 400B, resulting in avoiding to be largely deteriorated in the light availability.

As a result, the projector 1000E according to the exemplary embodiment, even when it is enabled to display a smooth and excellent moving image, becomes a projector where the light availability is not so much deteriorated.

In the above, projectors according to the invention are described based on the respective exemplary embodiments, the invention, without restricting to the respective embodiments, within a range that does not deviate from a gist of the invention, can be carried out in various modes. For instance, the following modifications are possible as well.

The projectors 1000 through 1000E according to the respective embodiments are transmission type projectors. However, the invention can be applied as well to a reflection type projector. Here, the transmission type means a type in which, like a transmission type liquid crystal device, an electro-optical modulator as an optical modulating device allows light to transmit, and the reflection type means a type in which, like a reflection type liquid crystal device, an electro-optical modulator as an optical modulating device reflects light. Even when the invention is applied to a reflection type projector, the invention is effective similarly to the case of a transmission type projector.

The projectors 1000 through 1000E according to the respective embodiments use a liquid crystal device as an electro-optical modulator. However, the invention is not restricted thereto. As the electro-optical modulator, in general, as far as it can modulate incident light in accordance with image information, a micro-mirror type optical modulator can be utilized. As the micro-mirror type optical modulator, for instance, DMD (digital micro-mirror device) (trade mark of Texas Instrument Corp.) can be used.

In the projectors 1000 through 1000E according to the respective embodiments, as a planar shape of the individual small lenses 122 and 122D of the first lens array 120 and 120D, a rectangle in which a ratio of a vertical dimension to a horizontal dimension is 1 to 4 and a rectangle in which a ratio of a vertical dimension to a horizontal dimension is 9 to 32 are used. However, the invention is not restricted thereto, and for instance a rectangle in which a ratio of a vertical dimension to a horizontal dimension is 3 to 8 can be preferably used.

In the projectors 1000 through 1000E according to the respective embodiments, as a scanning system, a rotating prism 770 is used. However, without restricting thereto, the invention can preferably use, for instance, a galvano mirror, a polygon mirror and the like.

In the projectors 1000 through 1000E according to the respective exemplary embodiments, as a light source device 110, a light source device that includes an ellipsoidal reflector 114, an arc tube having an emission center in the vicinity of a first point of focus of the ellipsoidal reflector 114 and a concave lens 118 is used. The invention, without restricting thereto, can preferably use a light source device having a paraboloid reflector and an arc tube having an emission center in the vicinity of a point of focus of the paraboloid reflector as well.

In the respective embodiments, only projectors that use three liquid crystal devices 400R, 400G and 400B are exemplified. However, the invention can be applied as well to a projector that uses less than three or four or more liquid crystal devices.

In the respective embodiments, only examples of a front type projector in which an image is projected from a direction from which a screen is observed are cited. However, the invention can be applied as well to a rear type projector in which an image is projected from a direction opposite to a direction from which a screen is observed.

Further, this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector, comprising:
an illumination system that includes a light source device that emits a first luminous flux toward a region to be illuminated; a first lens array having a plurality of small lenses that separate the first luminous flux emitted from the light source device into a plurality of first lens array light fluxes; a second lens array having a plurality of small lenses corresponding to the plurality of small lenses of the first lens array; a polarization conversion element that converts non-polarized light contained in second lens array light fluxes emitted from the second lens array into polarized light; and a superposing lens that superimposes individual polarization conversion element light fluxes emitted from the polarization conversion element on a region to be illuminated;
an electro-optical modulator that modulates a second luminous flux emitted from the illumination system in accordance with image information;
a projection optical system that projects a third luminous flux modulated by the electro-optical modulator;
each of the plurality of small lenses in the first lens array having, so as to make the second luminous flux emitted from the illumination system a luminous flux having a sectional shape that illuminates an entirety of an image formation region in one direction of vertical and horizontal directions in the image formation region of the electro-optical modulator and partially illuminates the image formation region thereof in an other direction, a planar shape compressed in the other direction;
a scanning system that is further disposed between the illumination system and the electro-optical modulator and that scans the second luminous flux along the other direction on the image formation region in synchronization with a frame rate of the electro-optical modulator;
the light source device emits the first luminous flux diverging with travel toward a region to be illuminated;
the plurality of small lenses in the first lens array being arranged along the one direction and the other direction;
the polarization conversion element including a polarized light separating element that splits the second lens array light fluxes into a luminous flux involving a first polarized light component and a luminous flux involving a second polarized light component; and a phase plate that converts one of the luminous flux involving the first polarized light component and the luminous flux involving the second polarized light component into an other;

the polarized light separating element including a plurality of polarized light separating prisms each of which has a polarized light separating surface that allows the luminous flux involving the first polarized light component of two polarized light components transmitting through as it is and reflects the luminous flux involving the second polarized light component in a direction perpendicular to an illumination optical axis; and a reflection surface that reflects the second polarized light component in a direction in parallel with the illuminationoptical axis;

the plurality of polarized light separating prisms being arranged along the one direction; and polarized light separating surfaces in the plurality of polarized light separating prisms at both ends in one direction of the polarized light separating element being constituted so as to reflect the luminous flux involving the second polarized light component in a direction approaching the illumination optical axis; wherein in the first lens array, a column in which the plurality of small lenses is arranged along the one direction being arranged in four columns along the other direction;

the plurality of polarized light separating prisms being arranged in four columns corresponding to columns of the plurality of small lenses in the first lens array; and in the respective small lenses in the first lens array, in comparison with amounts of eccentricity in the other direction of small lenses in first and fourth columns, amounts of eccentricity in the other direction of small lenses in second and third columns being larger.

2. The projector according to claim 1,
in the plurality of small lenses of the second lens array, a column along the one direction being arranged in four columns along the other direction; and
among the plurality of polarized light separating prisms, the polarized light separating surfaces in the polarized light separating prisms in first and fourth columns being constituted so as to reflect the luminous flux involving the second polarized light component in a direction approaching the illumination optical axis, and the polarized light separating surfaces in the polarized light separating prisms in second and third columns being constituted so as to reflect the luminous flux involving the second polarized light component in a direction receding from the illumination optical axis.

3. The projector according to claim 2, the plurality of small lenses in the first lens array being arranged in 8 to 10 columns along the other direction.

4. The projector according to claim 1,
in the plurality of small lenses of the second lens array, a column along the one direction being arranged in four columns along the other direction; and
among the plurality of small lenses in the second lens array, between small lenses in a first column and the small lenses in a second column and between small lenses in a third column and small lenses in a fourth column, a concave surface portion being disposed.

5. The projector according to claim 1,
in the plurality of small lenses of the second lens array a column along the one direction being arranged in four columns along the other direction; and
among the plurality of small lenses in the second lens array, between small lenses in a first column and small lenses in a second column and between small lenses in a third column and small lenses in a fourth column, a smooth connection being formed.

6. The projector according to claim 1,
in the plurality of small lenses of the second lens array a column along the one direction being arranged in four columns along the other direction; and
among the plurality of polarized light separating prisms, the polarized light separating surfaces in the polarized light separating prisms in first and fourth columns being constituted so as to reflect the luminous flux involving the second polarized light component in a direction approaching the illumination optical axis, and the polarized light separating surfaces in the polarized light separating prisms in second and third columns being constituted so as to reflect the luminous flux involving the second polarized light component in a direction approaching the illumination optical axis.

7. The projector according to claim 1, an optical axis of each of the plurality of small lenses in the first lens array being present within a width of each of the plurality of small lenses in the first lens array in the one direction.

8. The projector according to claim 1, as a small lens is receded more from an illumination optical axis in a column along the other direction each of the plurality of small lenses in the first lens array being larger in an amount of eccentricity in the other direction.

9. The projector according to claim 1, the light source device including an arc tube having a light emission portion; an ellipsoidal reflector that reflects light emitted from the light emission portion; a concave lens that converts light reflected by the ellipsoidal reflector into the first luminous flux that diverges with travel toward a region to be illuminated; and an auxiliary mirror that reflects the light emitted from the light emission portion to the region to be illuminated toward the light emission portion; and the auxiliary mirror, in order that, in a cross section of the first luminous flux on a light incident surface of the first lens array, a length along the other direction becomes shorter than a length along the one direction, having a shape in which a reflection concave surface is partially removed.

10. The projector according to claim 9,
the ellipsoidal reflector having a shape in which, when the light emitted from the light emission portion is assumed to go past without being reflected by the auxiliary mirror, a portion of the reflection concave surface necessary for reflecting the light emitted from the light emission portion is removed.

11. The projector according to claim 9,
in a cross section of the first luminous flux on a light incident surface of the first lens array a ratio of a length along the other direction to a length along the one direction being in the range of 30 to 80%.

12. The projector according to claim 1,
the first lens array having a light incident surface toward an ellipsoidal reflector and being disposed at such a position such that an amount of light of the first luminous flux emitted from the light source device is distributed over an entirety of the light incident surface.

13. The projector according to claim 1, further comprising:
between the illumination system and the electro-optical modulator, a color separating optical system that separates the second luminous flux emitted from the illumination system into a plurality of color lights; and as the electro-optical modulator, a plurality of electro-optical modulators which modulate the plurality of color lights emitted from the color separating optical system in accordance with image information corresponding to the plurality of color lights, respectively; and a dichroic prism that synthesizes the plurality of color lights modulated by the plurality of electro-optical modulators.

14. The projector according to claim 13, the scanning system being disposed between the illumination system and the color separating optical system at a position substantially conjugated with the electro-optical modulator and including a rotating prism having a rotation axis perpendicular to an illumination optical axis; and the rotating prism being constituted so that when the rotating prism rotates on the electro-optical modulator an illuminated region and a non-illuminated region is sequentially scrolled in synchronization with a frame rate of the electro-optical modulator.

* * * * *